US011864172B2

United States Patent
Wang et al.

(10) Patent No.: US 11,864,172 B2
(45) Date of Patent: Jan. 2, 2024

(54) HALF-DUPLEX-AWARE RESOURCE SELECTION IN SIDELINK

(71) Applicant: QUALCOMM Incorporated, San Diego, CA (US)

(72) Inventors: Xiaojie Wang, Hillsborough, NJ (US); Yisheng Xue, San Diego, CA (US); Jing Sun, San Diego, CA (US); Junyi Li, Chester, NJ (US); Piyush Gupta, Bridgewater, NJ (US); Xiaoxia Zhang, San Diego, CA (US); Ozcan Ozturk, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/110,184

(22) Filed: Dec. 2, 2020

(65) Prior Publication Data

US 2022/0174690 A1   Jun. 2, 2022

(51) Int. Cl.
*H04W 72/12*   (2009.01)
*H04L 5/16*   (2006.01)
(Continued)

(52) U.S. Cl.
CPC ....... *H04W 72/1263* (2013.01); *H04W 72/20* (2023.01); *H04L 5/16* (2013.01); *H04W 92/18* (2013.01)

(58) Field of Classification Search
CPC ...... H04L 43/16; H04L 5/16; H04W 72/1278; H04W 24/10; H04W 72/1263;
(Continued)

(56) References Cited

U.S. PATENT DOCUMENTS 10,548,086 B2   1/2020 Park et al.
11,051,304 B2 * 6/2021 Lee .............. H04W 72/0453
(Continued)

FOREIGN PATENT DOCUMENTS

CN   104581978 A   4/2015
EP   3627924 A1    3/2020
(Continued)

OTHER PUBLICATIONS

International Search Report and Written Opinion—PCT/US2021/072175—ISA/EPO—dated Feb. 28, 2022 (2100605WO).
Lenovo., et al., "Sidelink Resource Allocation for Reliability Enhancement", 3GPP TSG RAN WG1 #103-e, 3GPP Draft R1-2008918, 3rd Generation Partnership Project (3GPP), Mobile Competence Centre, 650, Route Des Lucioles, F-06921 Sophia-Antipolis Cedex, France, vol. RAN WG1, No. e-Meeting, Oct. 26, 2020-Nov. 13, 2020, Oct. 24, 2020 (Oct. 24, 2020), 5 Pages, XP051946730, Retrieved from the Internet: URL: https://ftp.3gpp.org/tsg_ran/WG1_RL1/TSGR1_103-e/Docs/R1-2008918.zip, R1-2008918.docx [retrieved on Oct. 24, 2020], Section: 2.1, p. 1-p. 4 section: 3, p. 5.
(Continued)

*Primary Examiner* — Ivan O Latorre
(74) *Attorney, Agent, or Firm* — Holland & Hart LLP/QUALCOMM Incorporated

(57) ABSTRACT

Methods, systems, and devices for wireless communications are described to support half-duplex-aware resource selection in sidelink. A physical (PHY) layer at a user equipment (UE) may report available resources to a medium access control (MAC) layer excluding some resources on which the UE is scheduled to receive or other UEs are scheduled to transmit. Specifically, the PHY layer may exclude resources on which the UE is scheduled to receive from a set of resources available for a sidelink transmission from the UE. Similarly, the PHY layer at the UE may exclude resources on which other UEs are scheduled to transmit from a set of resources available for a sidelink transmission to those UEs. A MAC layer at the UE may indicate to the PHY layer (e.g., directly or indirectly) the resources to be excluded when reporting available resources.

58 Claims, 9 Drawing Sheets

(51) Int. Cl.
*H04W 92/18* (2009.01)
*H04W 72/1263* (2023.01)
*H04W 72/20* (2023.01)

(58) Field of Classification Search
CPC ..... H04W 80/02; H04W 92/18; H04W 72/02; H04W 4/40
See application file for complete search history.

(56) References Cited

U.S. PATENT DOCUMENTS

| | | | |
|---|---|---|---|
| 11,277,819 B2* | 3/2022 | Cao | H04W 76/27 |
| 2017/0094656 A1* | 3/2017 | Chen | H04W 76/14 |
| 2018/0049084 A1* | 2/2018 | Lee | H04W 36/06 |
| 2018/0234973 A1* | 8/2018 | Lee | H04W 88/04 |
| 2019/0045389 A1* | 2/2019 | Belghoul | H04W 4/20 |
| 2020/0029340 A1 | 1/2020 | He et al. | |
| 2020/0169984 A1* | 5/2020 | Lee | H04W 80/08 |
| 2020/0229171 A1 | 7/2020 | Khoryaev et al. | |
| 2021/0058992 A1* | 2/2021 | Szilágyi | H04W 76/14 |
| 2021/0135928 A1* | 5/2021 | Yi | H04W 72/1284 |
| 2021/0144736 A1* | 5/2021 | Li | H04W 72/14 |
| 2021/0176751 A1* | 6/2021 | Belleschi | H04W 76/14 |
| 2021/0235328 A1* | 7/2021 | Hui | H04W 72/0446 |
| 2022/0061095 A1* | 2/2022 | Xue | H04W 72/02 |
| 2022/0086855 A1* | 3/2022 | Mallick | H04W 72/1215 |
| 2022/0174655 A1* | 6/2022 | Tsai | H04B 7/088 |
| 2022/0174711 A1 | 6/2022 | Wang et al. | |

FOREIGN PATENT DOCUMENTS

WO   WO-2019195563 A1   10/2019
WO   WO-2020011684 A1   1/2020

OTHER PUBLICATIONS

OPPO: "Inter-UE Coordination in Mode 2 of NR Sidelink", 3GPP TSG RAN WG1 #103-e, 3GPP Draft, R1-2009319, 3rd Generation Partnership Project (3GPP), Mobile Competence Centre, 650, Route Des Lucioles, F-06921 Sophia-Antipolis Cedex, France, vol. RAN WG1, No. e-Meeting, Oct. 26, 2020-Nov. 13, 2020, Oct. 26, 2020 (Oct. 26, 2020), 8 Pages, XP0519475231, Retrieved from the Internet: URL: https://ftp.3gpp.org/tsg_ran/WG1_RL1/TSGR1_103-e/Docs/R1-2009319.zip, R1-2009319_0PPO_mode 2 enhancement.docx, [retrieved on Oct. 26, 2020] figure 1, section: 2.1, p. 1-p. 2.
3GPP TS 38.212, "3rd Generation Partnership Project; Technical Specification Group Radio Access Network; NR; Multiplexing and Channel Coding (Release 16)", 3GPP TS 38.212, V16.3.0, Sep. 2020, Section 8, Valbonne, FR, 2020, 8 pages.
3GPP TS 38.213, "3rd Generation Partnership Project; Technical Specification Group Radio Access Network; NR; Physical Layer Procedures for Control (Release 16)", 3GPP TS 38.213, V16.3.0, Sep. 2020, Section 16, Valbonne, FR, 2020, 21 pages.
3GPP TS 38.214, "3rd Generation Partnership Project; Technical Specification Group Radio Access Network; NR; Physical Layer Procedures for Data (Release 16)", 3GPP TS 38.214, V16.3.0, Sep. 2020, Section 8, Valbonne, FR, 2020, 16 pages.
3GPP TS 38.321, "3rd Generation Partnership Project; Technical Specification Group Radio Access Network; NR; Medium Access Control (MAC) Protocol Specification (Release 16)", 3GPP TS 38.321, V16.2.1, Sep. 2020, Sections 5.22, 5.23 and 6.1.6, Valbonne, FR, 2020, 23 pages.

* cited by examiner

HALF-DUPLEX-AWARE RESOURCE SELECTION IN SIDELINK

INTRODUCTION

The following relates to wireless communications, and more specifically to managing sidelink resources.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

A method for wireless communication at a first user equipment (UE) is described. The method may include receiving, at a first protocol stack layer of the first UE from a second protocol stack layer of the first UE, an indication of a set of parameters. The method may further include receiving, from the second protocol stack layer of the first UE, an indication of a first subset of resources in which the first UE is scheduled to receive, a second UE is scheduled to transmit, or both. The method may further include reporting, to the second protocol stack layer of the first UE, a second subset of resources for a sidelink transmission based on sidelink control information, the set of parameters, and the first subset of resources. The method may further include receiving, from the second protocol stack layer, an indication of a resource for the sidelink transmission in response to reporting the second subset of resources for the sidelink transmission.

An apparatus for wireless communication at a first UE is described. The apparatus may include a processor and memory coupled to the processor. The processor and memory may be configured to receive, at a first protocol stack layer of the first UE from a second protocol stack layer of the first UE, an indication of a set of parameters. The processor and memory may further be configured to receive, from the second protocol stack layer of the first UE, an indication of a first subset of resources in which the first UE is scheduled to receive, a second UE is scheduled to transmit, or both. The processor and memory may be further configured to report, to the second protocol stack layer of the first UE, a second subset of resources for a sidelink transmission based at least in part on sidelink control information, the set of parameters, and the first subset of resources. The processor and memory may be further configured to receive, from the second protocol stack layer, an indication of a resource for the sidelink transmission in response to reporting the second subset of resources for the sidelink transmission.

Another apparatus for wireless communication at a first UE is described. The apparatus may include means for receiving, at a first protocol stack layer of the first UE from a second protocol stack layer of the first UE, an indication of a set of parameters. The apparatus may further include means for receiving, from the second protocol stack layer of the first UE, an indication of a first subset of resources in which the first UE is scheduled to receive, a second UE is scheduled to transmit, or both. The apparatus may further include means for reporting, to the second protocol stack layer of the first UE, a second subset of resources for a sidelink transmission based on sidelink control information, the set of parameters, and the first subset of resources. The apparatus may further include means for receiving, from the second protocol stack layer, an indication of a resource for the sidelink transmission in response to reporting the second subset of resources for the sidelink transmission.

A non-transitory computer-readable medium storing code for wireless communication at a first UE is described. The code may include instructions executable by a processor to receive, at a first protocol stack layer of the first UE from a second protocol stack layer of the first UE, an indication of a set of parameters. The code may further be executable to receive, from the second protocol stack layer of the first UE, an indication of a first subset of resources in which the first UE is scheduled to receive, a second UE is scheduled to transmit, or both. The code may further be executable to report, to the second protocol stack layer of the first UE, a second subset of resources for a sidelink transmission based at least in part on sidelink control information, the set of parameters, and the first subset of resources. The code may further be executable to receive, from the second protocol stack layer, an indication of a resource for the sidelink transmission in response to reporting the second subset of resources for the sidelink transmission.

In some examples of the method, apparatuses, and non-transitory computer-readable medium described herein, reporting the second subset of resources for the sidelink transmission may include operations, features, means, or instructions for reporting at least a threshold percentage of a set of resources, where the first subset of resources may be excluded from the at least the threshold percentage of the set of resources. In some examples of the method, apparatuses, and non-transitory computer-readable medium described herein, the threshold percentage may be based on a size of the first subset of resources. In some examples of the method, apparatuses, and non-transitory computer-readable medium described herein, the threshold percentage includes a first threshold percentage and corresponds to a maximum of two values, the two values including a first value corresponding to a minimum of a second threshold percentage of the set of resources to be reported and a second value corresponding to the second threshold percentage multiplied by a scaling factor, wherein the scaling factor is based at least in part on the size of the first subset of resources.

In some examples of the method, apparatuses, and non-transitory computer-readable medium described herein, reporting the second subset of resources for the sidelink transmission may include operations, features, means, or instructions for reporting at least a threshold percentage of all resources in a set of resources excluding the first subset of resources. In some examples of the method, apparatuses, and non-transitory computer-readable medium described herein, reporting, to the second protocol stack layer of the first UE, one or more resources in the first subset of resources for the sidelink transmission.

In some examples of the method, apparatuses, and non-transitory computer-readable medium described herein, receiving the indication of the first subset of resources in which the first UE may be scheduled to receive, the second UE may be scheduled to transmit, or both may include operations, features, means, or instructions for receiving a list of one or more UEs scheduled to transmit data to or receive data from the first UE, where the list of one or more UEs includes the second UE, identifying that at least one resource of the first subset of resources may be reserved by the second UE, and determining that the second UE may be scheduled to transmit on the at least one resource based on identifying that the at least one resource may be reserved by the second UE. Some examples of the method, apparatuses, and non-transitory computer-readable medium described herein may further include operations, features, means, or instructions for reporting, to the second protocol stack layer of the first UE, one or more resources reserved by the UEs in the list, where the first subset of resources includes the one or more resources and reporting a UE identifier with each of the one or more resources, the UE identifier identifying a UE in the list that reserved the resource.

Some examples of the method, apparatuses, and non-transitory computer-readable medium described herein may further include operations, features, means, or instructions for receiving, from the second protocol stack layer of the first UE, a threshold quantity of UEs and identifying that at least the threshold quantity of UEs may be scheduled to transmit on at least one resource of the first subset of resources, where reporting the second subset of resources for the sidelink transmission includes. In some examples of the method, apparatuses, and non-transitory computer-readable medium described herein, reporting the second subset of resources for the sidelink transmission may include operations, features, means, or instructions for reporting at least a threshold percentage of a set of resources for the sidelink transmission after excluding the at least one resource.

In some examples of the method, apparatuses, and non-transitory computer-readable medium described herein, the sidelink transmission includes a groupcast or broadcast transmission. In some examples of the method, apparatuses, and non-transitory computer-readable medium described herein, the set of parameters includes a threshold percentage of a set of resources to report for the sidelink transmission, a priority of the sidelink transmission, a reference signal received power threshold for selecting resources, or a combination thereof A method for wireless communication at a first UE is described. The method may include providing, to a first protocol stack layer of the first UE from a second protocol stack layer of the first UE, an indication of a set of parameters. The method may further include providing, to the first protocol stack layer of the first UE, an indication of a first subset of resources in which the first UE is scheduled to receive, a second UE is scheduled to transmit, or both. The method may further include receiving, from the first protocol stack layer of the first UE, a second subset of resources for a sidelink transmission based on sidelink control information, the set of parameters, and the first subset of resources. The method may further include providing, to the first protocol stack layer, an indication of a resource for the sidelink transmission in response to receiving the second subset of resources for the sidelink transmission.

An apparatus for wireless communication at a first UE is described. The apparatus may include a processor and memory coupled to the processor. The processor and memory may be configured to provide, to a first protocol stack layer of the first UE from a second protocol stack layer of the first UE, an indication of a set of parameters. The processor and memory may further be configured to provide, to the first protocol stack layer of the first UE, an indication of a first subset of resources in which the first UE is scheduled to receive, a second UE is scheduled to transmit, or both. The processor and memory may further be configured to receive, from the first protocol stack layer of the first UE, a second subset of resources for a sidelink transmission based on sidelink control information, the set of parameters, and the first subset of resources. The processor and memory may further be configured to provide, to the first protocol stack layer, an indication of a resource for the sidelink transmission in response to receiving the second subset of resources for the sidelink transmission.

Another apparatus for wireless communication at a first UE is described. The apparatus may include means for providing, to a first protocol stack layer of the first UE from a second protocol stack layer of the first UE, an indication of a set of parameters. The apparatus may further include means for providing, to the first protocol stack layer of the first UE, an indication of a first subset of resources in which the first UE is scheduled to receive, a second UE is scheduled to transmit, or both. The apparatus may further include means for receiving, from the first protocol stack layer of the first UE, a second subset of resources for a sidelink transmission based on sidelink control information, the set of parameters, and the first subset of resources. The apparatus may further include means for providing, to the first protocol stack layer, an indication of a resource for the sidelink transmission in response to receiving the second subset of resources for the sidelink transmission.

A non-transitory computer-readable medium storing code for wireless communication at a first UE is described. The code may include instructions executable by a processor to provide, to a first protocol stack layer of the first UE from a second protocol stack layer of the first UE, an indication of a set of parameters. The code may further be executable to provide, to the first protocol stack layer of the first UE, an indication of a first subset of resources in which the first UE is scheduled to receive, a second UE is scheduled to transmit, or both. The code may further be executable to receive, from the first protocol stack layer of the first UE, a second subset of resources for a sidelink transmission based on sidelink control information, the set of parameters, and the first subset of resources. The code may further be executable to provide, to the first protocol stack layer, an indication of a resource for the sidelink transmission in response to receiving the second subset of resources for the sidelink transmission.

In some examples of the method, apparatuses, and non-transitory computer-readable medium described herein, receiving the second subset of resources for the sidelink transmission may include operations, features, means, or instructions for receiving at least a threshold percentage of a set of resources, where the first subset of resources may be excluded from the at least the threshold percentage of the set of resources. In some examples of the method, apparatuses, and non-transitory computer-readable medium described herein, the threshold percentage may be based on a size of the first subset of resources. In some examples of the method, apparatuses, and non-transitory computer-readable medium described herein, the threshold percentage includes a first threshold percentage and corresponds to a maximum of two values, the two values including a first value corresponding to a minimum of a second threshold percentage of the set of resources to be reported and a second value corresponding to the second threshold percentage multiplied by a scaling factor, wherein the scaling factor is based at least in part on the size of the first subset of resources.

In some examples of the method, apparatuses, and non-transitory computer-readable medium described herein, receiving the second subset of resources for the sidelink transmission may include operations, features, means, or instructions for receiving at least a threshold percentage of all resources in a set of resources excluding the first subset of resources. Some examples of the method, apparatuses, and non-transitory computer-readable medium described herein may further include operations, features, means, or instructions for receiving, from the first protocol stack layer, one or more resources in the first subset of resources for the sidelink transmission and avoiding selecting the resource for the sidelink transmission from the one or more resources in the first subset of resources based at least in part on the first UE being scheduled to receive on the one or more resources, the second UE being scheduled to transmit on the one or more resources, or both.

In some examples of the method, apparatuses, and non-transitory computer-readable medium described herein, providing the indication of the first subset of resources in which the first UE may be scheduled to receive, the second UE may be scheduled to transmit, or both may include operations, features, means, or instructions for providing a list of one or more UEs scheduled to transmit data to or receive data from the first UE, where the list of one or more UEs includes the second UE, and at least one resource of the first subset of resources may be reserved by the second UE. Some examples of the method, apparatuses, and non-transitory computer-readable medium described herein may further include operations, features, means, or instructions for receiving an indication of one or more resources reserved by the UEs in the list, where the first subset of resources includes the one or more resources and receiving a UE identifier with each of the one or more resources, the UE identifier identifying a UE in the list that reserved the resource.

Some examples of the method, apparatuses, and non-transitory computer-readable medium described herein may further include operations, features, means, or instructions for providing, to the first protocol stack layer of the first UE, a threshold quantity of UEs, where receiving the second subset of resources for the sidelink transmission may include operations, features, means, or instructions for receiving the second subset of resources for the sidelink transmission based on providing the threshold quantity of UEs, where at least one resource of the first subset of resources may be excluded from the second subset of resources based on the threshold quantity of UEs being scheduled to transmit in the at least one resource.

In some examples of the method, apparatuses, and non-transitory computer-readable medium described herein, receiving the second subset of resources for the sidelink transmission may include operations, features, means, or instructions for receiving at least a threshold percentage of a set of resources for the sidelink transmission after the first subset of resources may be excluded. In some examples of the method, apparatuses, and non-transitory computer-readable medium described herein, the sidelink transmission includes a groupcast or broadcast transmission. In some examples of the method, apparatuses, and non-transitory computer-readable medium described herein, the set of parameters includes a threshold percentage of a set of resources to report for the sidelink transmission, a priority of the sidelink transmission, a reference signal received power threshold for selecting resources, or a combination thereof.

DETAILED DESCRIPTION

Figure 1:
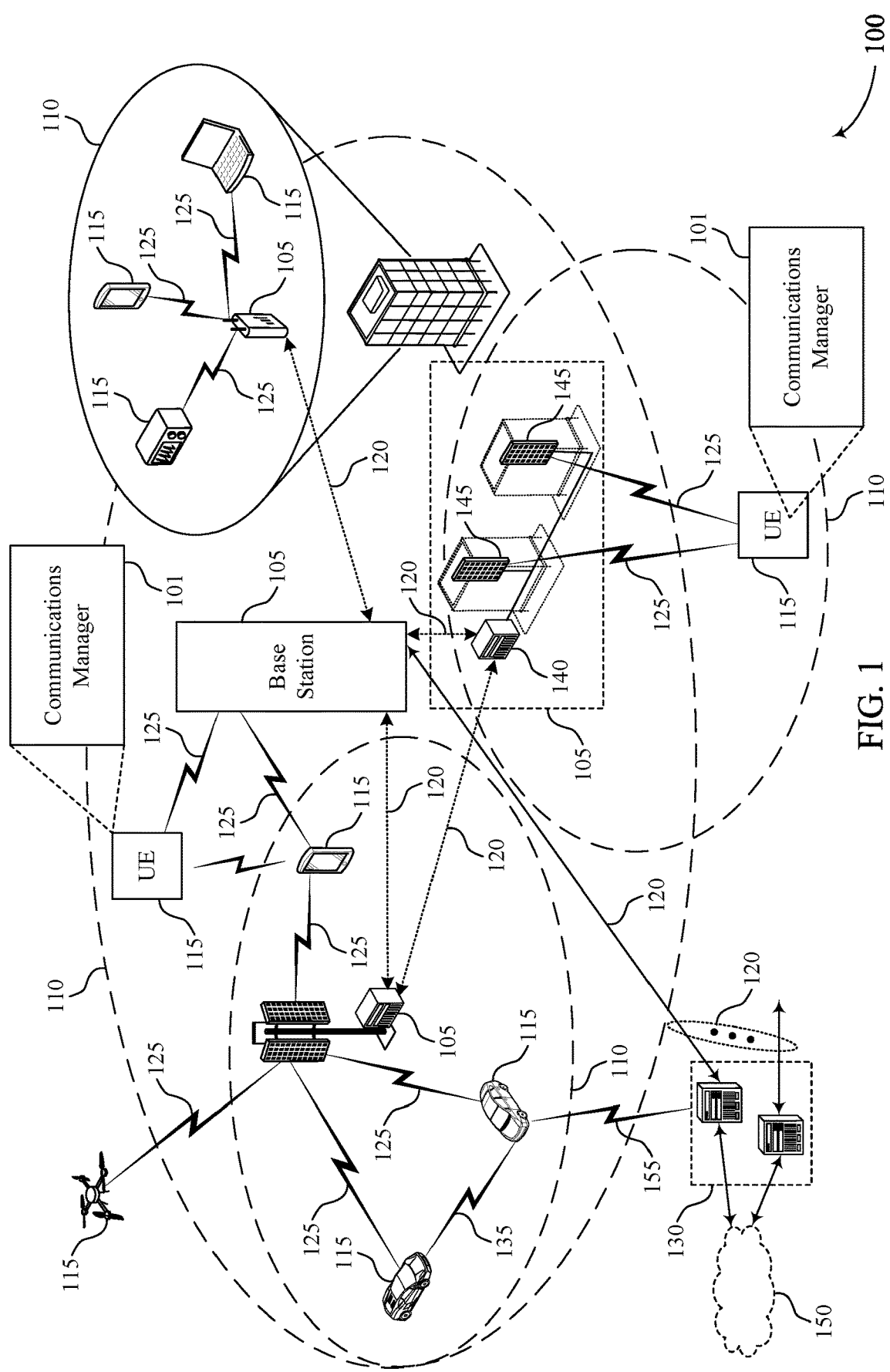
FIG. 1 illustrates an example of a wireless communications system that supports half-duplex-aware resource selection in sidelink in accordance with one or more aspects of the present disclosure.

A wireless communications system may include multiple UEs which may communicate with each other using sidelink communications. The UEs may allocate resources (e.g., time and/or frequency resources) using an allocation mode based on UE selection of the resources (e.g., a mode 2 for sidelink resource allocation that excludes a base station from the resource selection process). For example, a UE may perform channel sensing (e.g., sidelink channel sensing) by decoding sidelink control information (SCI) (e.g., control information communicated via one or more sidelink channels) to identify available sidelink resources. Available sidelink resources may refer to resources available for a sidelink transmission from the UE, and unavailable sidelink resources may refer to resources unavailable for a sidelink transmission from the UE (e.g., reserved by another UE).

The sensing may be performed by a physical (PHY) layer (e.g., a layer where transport channels may be mapped to physical channels) of a protocol stack of the UE, for example, by decoding scheduling information included in received SCI. The protocol stack may be used for communications in a packet-based network that operates according to a layered protocol stack at a UE, for example, where each layer of the protocol stack may perform one or more operations for the communications. Each SCI received by the UE may be broadcast by another UE and may indicate sidelink resources reserved by the other UE. The UE (e.g., the PHY layer of the UE) may receive the SCI during a sensing window and may use the information included in the SCI to identify or determine available resources. The sensing window may correspond to a set of resources that the UE may monitor for SCI from other UEs.

In one example, the PHY layer may determine unavailable resources by decoding SCI and comparing a measured reference signal received power (RSRP) to an RSRP threshold. The measured RSRP may be an RSRP of the SCI or an RSRP of a physical sidelink shared channel (PSSCH) associated with the SCI (i.e., transmitted in a same slot as the SCI). If the measured RSRP satisfies or exceeds the RSRP threshold, the resources reserved by the SCI may be considered unavailable resources (e.g., unavailable for a sidelink transmission from a UE). If the measured RSRP fails to meet the RSRP threshold, the resources reserved by the SCI may be considered available resources. Resources not reserved by SCI may also be considered available (e.g., available for a sidelink transmission from a UE). Thus, unavailable resources may correspond to resources reserved by SCI with a measured RSRP that is above an RSRP threshold, and available resources may correspond to resources unreserved by SCI or resources reserved by SCI with a measured RSRP that is below an RSRP threshold. If a percentage of available resources does not meet a threshold percentage, the PHY layer may increase the RSRP threshold associated with received SCI and may determine new available resources based on the increased RSRP threshold.

Upon identifying or determining a quantity of available resources that satisfies (e.g., meets or exceeds) the threshold percentage, the PHY layer may report the available resources (e.g., report a set of resources) to a medium access control (MAC) layer of the UE. Because resources reserved by SCI may be considered available if the measured RSRP fails to meet the RSRP threshold, the PHY layer at a UE may report that resources reserved by another UE are available for a sidelink transmission. In some cases, however, if UEs in a wireless communications system are operating in a half-duplex mode, the use of resources reserved by another UE for the sidelink transmission may lead to a half-duplex UE being scheduled for full-duplex communications.

For example, if a first UE is operating in a half-duplex mode and is scheduled to receive sidelink data on a resource, the first UE may be unable to transmit on the resource. However, if a PHY layer at the first UE indicates that the resource is available for a sidelink transmission by the first UE, the MAC layer at the first UE may schedule the first UE to transmit on the resource on which the first UE is already scheduled to receive. Similarly, if a second UE is operating in a half-duplex mode and is scheduled to transmit sidelink data on a resource, the second UE may be unable to receive a sidelink transmission on the resource. However, if the PHY layer at the first UE indicates that the resource is available for the sidelink transmission to the second UE, the MAC layer at the first UE may schedule the sidelink transmission to the second UE on the resource on which the second UE is already scheduled to transmit.

If a half-duplex UE is scheduled to simultaneously transmit and receive (e.g., scheduled for full-duplex communications), the half-duplex UE may either fail to transmit, fail to receive, or both, resulting in reduced throughput in a wireless communications system. In some examples, to avoid scheduling a half-duplex UE for full-duplex communications, a MAC layer at a half-duplex UE may avoid selecting resources for a sidelink transmission on which the half-duplex UE is already scheduled to receive another sidelink transmission. In such examples, however, it may be inefficient for the PHY layer to report these resources to the MAC layer as available resources for the sidelink transmission (i.e., because the MAC layer would avoid selecting these resources for the sidelink transmission). Further, if the PHY layer is configured to report a threshold percentage of resources to the MAC layer as available resources for a sidelink transmission, and the PHY layer reports resources to the MAC layer that the MAC layer would avoid selecting for the sidelink transmission, the MAC layer would have less resources than the threshold percentage of resources from which to select a resource for the sidelink transmission.

The present disclosure provides techniques for efficiently performing resource selection for a sidelink transmission that is scheduled to be transmitted or received by a half-duplex UE. Specifically, a PHY layer at a UE may exclude resources on which the UE is scheduled to receive from a set of resource available for a sidelink transmission from the UE. Similarly, the PHY layer at the UE may exclude resources on which other UEs are scheduled to transmit from a set of resources available for a sidelink transmission to those UEs. A MAC layer at the UE may indicate to the PHY layer the resources to be excluded by the PHY layer when reporting available resources. Accordingly, the PHY layer may exclude the indicated resources from resources reported as available for the sidelink transmission, and the MAC layer may avoid scheduling the sidelink transmission on the excluded resources.

The indication of the resources for the PHY layer to exclude from the set of resources available for the sidelink transmission may be a direct indication or an indirect indication. A direct indication may refer to an explicit indication of the resources for the PHY layer to exclude from the set of resources available for the sidelink transmission. An indirect indication may refer to an implicit indication of the resources for the PHY layer to exclude from the set of resources available for the sidelink transmission. For instance, the indirect indication may provide information (e.g., list of UEs identifiers (IDs) or a threshold quantity of UEs) for the PHY layer to use to identify the resources to exclude from the set of resources available for the sidelink transmission. The excluded resources may be resources in which a UE scheduled to transmit the sidelink transmission may be scheduled to receive or resources in which a UE scheduled to receive the sidelink transmission may be scheduled to transmit.

Aspects of the disclosure are initially described in the context of wireless communications systems. Aspects of the disclosure are further illustrated by and described with reference to process flows, apparatus diagrams, system diagrams, and flowcharts that relate to half-duplex-aware resource selection in sidelink.

FIG. 1 illustrates an example of a wireless communications system 100 that supports half-duplex-aware resource selection in sidelink in accordance with one or more aspects of the present disclosure. The wireless communications system 100 may include one or more base stations 105, one or more UEs 115, and a core network 130. In some examples, the wireless communications system 100 may be an LTE network, an LTE-A network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. A UE 115 may communicate with the core network 130 through a communication link 155.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

The wireless communications system 100 may operate using one or more frequency bands, for example, in the range of 300 megahertz (MHz) to 300 gigahertz (GHz). The region from 300 MHz to 3 GHz may be known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack, for example, at a UE 115 or a base station 105, or both. In the user plane, communications at the bearer or Packet Data Convergence Protocol (PDCP) layer may be IP-based. A Radio Link Control (RLC) layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the PHY layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

As described herein, a PHY layer at a UE 115 (e.g., a UE 115 performing sidelink communications) may exclude resources on which the UE 115 is scheduled to receive from a set of resource available for a sidelink transmission from the UE 115. Similarly, the PHY layer at the UE 115 may exclude resources on which other UEs 115 are scheduled to transmit from a set of resources available for a sidelink transmission to those other UEs 115. A MAC layer at the UE 115 may indicate to the PHY layer the resources to be excluded by the PHY layer when reporting available resources. Accordingly, the PHY layer may exclude the indicated resources from resources reported as available for the sidelink transmission, and the MAC layer may avoid scheduling the sidelink transmission on the excluded resources.

In various examples, a communication manager 101 may be included in a UE 115 to support sidelink resource management (e.g., resource identification and selection). In some examples, a communications manager 101 may receive, at a first protocol stack layer (e.g., PHY layer) of the first UE from a second protocol stack layer (e.g., MAC layer) of the first UE, an indication of a set of parameters. The communications manager 101 may receive, from the second protocol stack layer of the first UE, an indication of a first subset of a set of resources in which the first UE is scheduled to receive, a second UE is scheduled to transmit, or both. The communications manager 101 may report, to the second protocol stack layer of the first UE, a second subset of the set of resources available for a sidelink transmission based at least in part on SCI, the set of parameters, and the first subset of resources. The communications manager 101 may receive, from the second protocol stack layer, an indication of a resource for the sidelink transmission in response to reporting the second subset of resources available for the sidelink transmission.

Additionally, or alternatively, the communications manager 101 may provide, to a first protocol stack layer (e.g., PHY layer) of the first UE from a second protocol stack layer (e.g., MAC layer) of the first UE, an indication of a set of parameters. The communications manager 101 may provide, to the first protocol stack layer of the first UE, an indication of a first subset of a set of resources in which the first UE is scheduled to receive, a second UE is scheduled to transmit, or both. The communications manager 101 may receive, from the first protocol stack layer of the first UE, a second subset of the set of resources available for a sidelink transmission based at least in part on SCI, the set of parameters, and the first subset of resources. The communications manager 101 may provide, to the first protocol stack layer, an indication of a resource for the sidelink transmission in response to receiving the second subset of resources available for the sidelink transmission.

Figure 2:
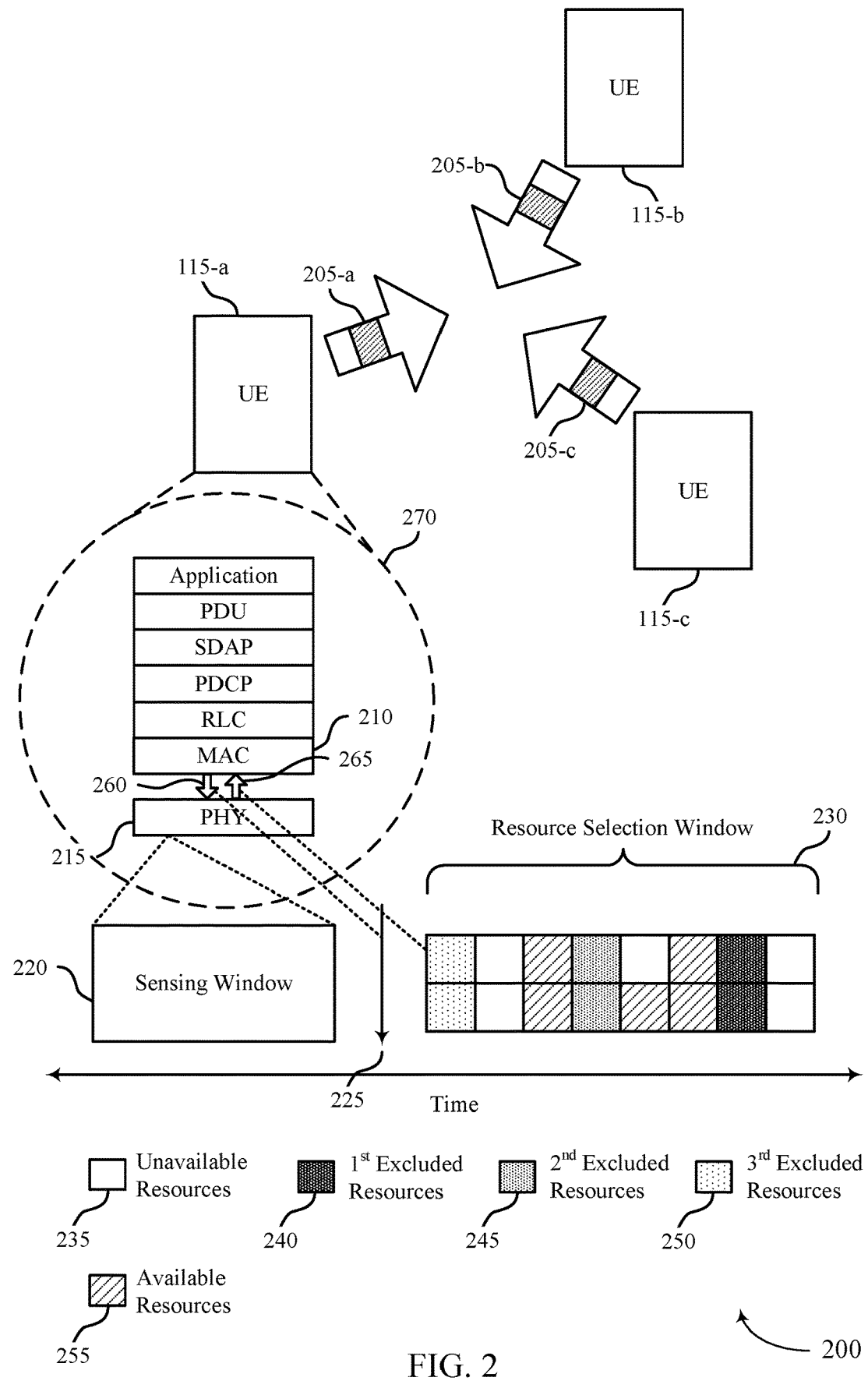
FIG. 2 illustrates an example of a wireless communications system that supports half-duplex-aware resource selection in sidelink in accordance with one or more aspects of the present disclosure.

FIG. 2 illustrates an example of a wireless communications system 200 that supports half-duplex-aware resource selection in sidelink in accordance with one or more aspects of the present disclosure. In some examples, wireless communications system 200 may implement aspects of wireless communications system 100. For example, wireless communications system 200 may include multiple UEs 115 which may represent examples of UEs 115 described with reference to FIG. 1. The multiple UEs 115 may include UEs 115-a, 115-b, and 115-c, which may communicate with each other or with other UEs 115 using sidelink communications. UEs 115-a, 115-b, and 115-c may allocate resources using an allocation mode based on UE selection of the resources (e.g., a mode 2 for sidelink resource allocation). In the example of FIG. 2, the UE 115-a may be scheduled to transmit a sidelink transmission to at least the UE 115-b.

For example, UE 115-a (e.g., in addition to UEs 115-b and 115-c) may perform channel sensing (e.g., sidelink channel sensing) by decoding SCI 205 to identify unoccupied or available sidelink resources. Unoccupied resources may refer to resources unused or unreserved by other UEs 115, and available resources may refer to resources available for a sidelink transmission. Examples of available resources may be unoccupied resources or resources reserved by SCI with a measured RSRP that is below an RSRP threshold. The sensing may be performed by a PHY layer 215 of a protocol stack 270 of UE 115-a, for example, by decoding scheduling information included in SCIs 205-b and 205-c, among other SCI 205. Each SCI 205 received by UE 115-a may be broadcast by another UE 115 (e.g., UE 115-b may broadcast SCI 205-b, and so forth) and may indicate sidelink resources reserved by the UE 115. UE 115-a (e.g., the PHY layer 215 of UE 115-a) may receive the SCI 205 during a sensing window 220 and may use the information included in the SCI 205 to identify or determine available resources.

The PHY layer 215 may obtain parameters for performing the channel sensing from a higher protocol stack layer of UE 115-a, such as a MAC layer 210 of the protocol stack 270. The MAC layer 210 may trigger selection of resources for a sidelink transmission and may, for example, provide a trigger 225 to the PHY layer 215 (e.g., via communications 260) for the PHY layer 215 to report a resource schedule for a resource selection window 230. The MAC layer 210 may also provide, to the PHY layer 215 (e.g., via communications 260), an indication of a sidelink resource pool for resource selection, a priority of the sidelink transmission (e.g., a layer 1 (L1) priority), a packet delay budget for the sidelink transmission, a number of subchannels for a data channel (e.g., PSSCH) or for a control channel (e.g., physical sidelink control channel (PSCCH)) associated with the sidelink transmission, a resource reservation interval for periodic resource reservation, a threshold percentage of available resources to report (e.g., SL-xPercentage), or a length of the sensing window 220, among other examples. The PHY layer 215 may perform channel sensing to identify available resources based on the parameters indicated by the MAC layer 210.

When performing sensing to identify available resources, the PHY layer 215 may determine unavailable resources 235 by decoding SCI 205 (e.g., an SCI-1) and comparing a measured RSRP (e.g., measured RSRP of the SCI 205 or a PSSCH associated with the SCI 205) to an RSRP threshold. The RSRP threshold may be based on a priority of the sidelink transmission and a priority associated with the SCI 205, among other examples. If the measured RSRP satisfies or exceeds the RSRP threshold, the resources reserved by the SCI 205 may be considered unavailable resources 235. If the measured RSRP fails to meet the RSRP threshold, the resources reserved by the SCI 205 may be considered available resources. Resources not reserved by SCI 205 may also be considered available.

Based on the determination of the available resources, the PHY layer 215 may also determine a percentage of resources within the resource selection window 230 that are available (e.g., SL-xPercentage). If the percentage of available resources does not meet the threshold percentage provided by the MAC layer 210 (e.g., SL-xPercentage), the PHY layer 215 may increase the RSRP threshold associated with the received SCI 205 (e.g., may increase each threshold by 3 decibels (dB)) and may determine new available resources in the resource selection window 230 based on the increased RSRP threshold. If the percentage of available resources still does not meet the threshold percentage provided by the MAC layer 210 (e.g., SL-xPercentage), PHY layer 215 may further increase the RSRP threshold (e.g., by 3 dB), and may repeat this process until meeting the threshold percentage for the available resources.

Upon identifying or determining a quantity of available resources that satisfies (e.g., meets or exceeds) the threshold percentage, the PHY layer 215 may report the available resources (e.g., report a set of resources) to the MAC layer 210 (e.g., via communications 265). The MAC layer 210 may create a sidelink grant (e.g., may reserve sidelink resources for the sidelink transmission) based on the report of the available resources from the PHY layer 215. Because resources reserved by SCI may be considered available if the measured RSRP fails to meet the RSRP threshold, the PHY layer 215 may report that resources reserved by another UE are available for a sidelink transmission. In some cases, however, if UEs 115 in wireless communications system 200 are operating in a half-duplex mode, the use of resources reserved by another UE for the sidelink transmission may lead to a half-duplex UE being scheduled for full-duplex communications, which may be detrimental to the wireless communications system 200.

For example, if the UE 115-a is operating in a half-duplex mode and is scheduled to receive sidelink data on a resource, the UE 115-a may be unable to transmit on the resource. Thus, if the PHY layer 215 at the UE 115-a indicates that the resource is available for a sidelink transmission by the UE 115-a, the MAC layer 210 at the UE 115-a may schedule the UE 115-a to transmit on the resource on which the UE 115-a is already scheduled to receive. Similarly, if the UE 115-b is operating in a half-duplex mode and is scheduled to transmit sidelink data on a resource, the UE 115-b may be unable to receive a sidelink transmission on the resource. Thus, if the PHY layer 215 at the UE 115-a indicates that the resource is available for the sidelink transmission to the UE 115-b, the MAC layer 210 at the UE 115-A may schedule the UE 115-b to receive on the resource on which the UE 115-b is already scheduled to transmit. If a half-duplex UE 115 is scheduled to simultaneously transmit and receive (e.g., scheduled for full-duplex communications), the half-duplex UE may either fail to transmit, fail to receive, or both, resulting in reduced throughput in a wireless communications system.

The present disclosure provides techniques for efficiently performing resource selection for a sidelink transmission that is scheduled to be transmitted or received by a half-duplex UE 115. Specifically, the PHY layer 215 at the UE 115-a may exclude resources on which the UE 115-a is scheduled to receive from resources available for a sidelink transmission from the UE 115-a. These excluded resources may correspond to first excluded resources 240 in FIG. 2. The MAC layer 210 may provide the PHY layer 215 with a list of first excluded resources 240 (e.g., slots) in which the UE 115-a may be in a reception mode (e.g., scheduled to receive). The MAC layer 210 may maintain the list of first excluded resources 240 for data reception based on a configuration by upper layers (e.g., based on periodical data exchange with other UEs 115, such as the UE 115-b or the UE 115-c). The PHY layer 215 may then exclude the resources 240 from the resources available for the sidelink transmission from the UE 115-a.

Similarly, the PHY layer 215 at the UE 115-a may exclude resources on which other UEs 115 are scheduled to transmit from resources available for a sidelink transmission to those UEs. These resources may correspond to second excluded resources 245 or third excluded resources 250 in FIG. 2. The MAC layer 210 may indirectly provide the PHY layer 215 with the second excluded resources 245 or the third excluded resources 250 in which other UEs 115 may be in a transmission mode (e.g., scheduled to transmit).

In one example, the MAC layer 210 may provide the PHY layer 215 with a list of UE IDs corresponding to a list of UEs. The list of UEs 115 may include UEs 115 from which the MAC layer 210 may expect traffic or UEs 115 to which the MAC layer 210 may transmit. If the UE 115-a wants to transmit to the UE 115-b, and the UE 115-b is scheduled to transmit in slot n, the UE 115-a may avoid transmitting in slot n since the UE 115-b may be unable to receive or listen in slot n. Thus, the PHY layer 215 may identify resources reserved by the list of UEs 115, and the UE 115-a may exclude these resources from resources available for the sidelink transmission. These excluded resources may correspond to second excluded resources 245 in FIG. 2. In some cases, the UE 115-a may also be switched to a reception mode (e.g., scheduled to receive) on the second excluded resources 245 (e.g., slots) reserved by the list of UEs 115. Because the MAC layer 210 may provide the PHY layer 215 with the list of UEs 115, and the PHY layer 215 may identify the second excluded resources 245 based on the list of UEs 115, the MAC layer 210 may be said to indirectly provide the PHY layer 215 with the second excluded resources 245.

In another example, the MAC layer 210 may provide the PHY layer 215 with a threshold quantity of UEs 115 (e.g., within a communication range), or the PHY layer 215 may otherwise identify the threshold quantity of UEs 115 (e.g., within the communication range). The PHY layer may then calculate a quantity of UEs (e.g., within the communication range) that reserve a resource (e.g., in each slot). If the UE 115-a is configured to determine if a resource is reserved by the threshold quantity of UEs within a communication range, the UE 115-a may obtain the communication range based on sidelink communications history or other distance sensor data provided by an upper layer. The PHY layer may identify resources reserved by at least the threshold quantity of UEs, and the UE 115-a may exclude these resources from resources available for the sidelink transmission. These excluded resources may correspond to third excluded resources 250 in FIG. 2. Because the MAC layer 210 may provide the PHY layer 215 with the threshold quantity of UEs 115, and the PHY layer 215 may identify the third excluded resources 250 based on the threshold quantity of UEs 115, the MAC layer 210 may be said to indirectly provide the PHY layer 215 with the third excluded resources 250.

In some cases, the MAC layer 210 may provide the threshold quantity of UEs 115 if the sidelink transmission (e.g., data packet) from the UE 115-a includes groupcast or broadcast traffic. In such cases, transmitting the sidelink transmission on resources reserved by at least the threshold quantity of UEs 115 may be meaningless since these UEs 115 may not be able to listen on these resources. Further, in such cases, the threshold quantity of UEs may apply to any communication range. That is, if the PHY layer 215 determines that a resource is reserved by the threshold quantity of UEs within any communication range or an unspecified communication range, the PHY layer 215 may exclude the resource from resources available for the sidelink transmission.

Once the PHY layer 215 identifies resources to exclude from the available resources 255 (e.g., the first excluded resources 240, second excluded resources 245, or third excluded resources 250), the PHY layer 215 may report the available resources 255 to the MAC layer 210. The first excluded resources 240, the second excluded resources 245, the third excluded resources 250, or a combination thereof may correspond to a first subset of resources in the set of resources that make up the resource selection window 230. Further, the available resources 255 may correspond to a second subset of resources in the set of resources that make up the resource selection window 230. As described above, the PHY layer 215 may report at least a threshold percentage of resources as available resources 255. The MAC layer 210 may provide the threshold percentage to the PHY layer 215.

In one aspect, resources in slots in which the UE 115-a is scheduled to receive or the UE 115-b is scheduled to transmit may all be excluded from the available resources 255. In some examples, the PHY layer 215 may report at least the threshold percentage of resources (X) indicated by the MAC layer 210 to the MAC layer 210 as the available resources 255. In other examples, the PHY layer 215 may report a different threshold percentage of resources (Y) from the threshold percentage of resources (X) indicated by the MAC layer 210 to the MAC layer 210 as the available resources 255. The different threshold percentage of resources (Y) may depend on the size of the list of resources excluded from the available resources 255. As an example, Y=max (Xmin, X*alpha), where alpha is a scaling factor depending on the size of the list of resources excluded from the available resources 255, and Xmin is a minimum percentage (e.g., also provided by the MAC layer 210).

In another aspect, resources in slots in which the UE 115-a is scheduled to receive or the UE 115-b is scheduled to transmit may not contribute (e.g., fail to contribute) to a threshold percentage of resources (X) indicated as available resources 255. That is, the PHY layer 215 may report, to the MAC layer 210, at least the threshold percentage (X) (e.g., indicated by the MAC layer 210) of all resources in the set of resources in the resource selection window 230 excluding the first subset of resources. The first subset of resources include the first excluded resources 240, the second excluded resources 245, the third excluded resources 250, or a combination thereof.

In some cases, the PHY layer 215 may still report one or more resources (e.g., slots) in the first subset of resources (e.g., slots) for the sidelink transmission. The one or more resources in the first subset of resources may correspond to those resources scheduled by SCI 205 with a measured RSRP below the RSRP threshold. However, the one or more resources in the first subset of resources may not contribute to the threshold percentage. The MAC layer 210 may report the one or more resources in the first subset of resources to an upper layer (e.g., for inter-UE coordination as recommended resources for data reception). The one or more resources may be available for the sidelink transmission from the perspective of the PHY layer 215 but may be unavailable for the sidelink transmission from the perspective of the MAC layer 210. Thus, the MAC layer may avoid selecting a resource for the sidelink transmission from the one or more resources in the first subset of resources.

The examples described herein of excluding resources from available resources 255 may be implemented together or may be implemented separately, without departing from the scope of the present disclosure. For example, the PHY layer 215 may exclude resources 240 from the available resources 255 and avoid excluding resources 245 or resources 250. That is, the PHY layer 215 may exclude resources in which the UE 115-a is operating in a reception mode (e.g., scheduled to receive) from the available resources 255, resources in which the UE 115-b is operating in a transmission mode (e.g., scheduled to transmit) from the available resources 255, or both. Further, the PHY layer 215 may exclude any combination of resources 240, 245, and 250 from the available resources 255.

In any of the examples described herein, the MAC layer 210 may notify the PHY layer 215 of the selected resource for the sidelink transmission (e.g., via communications 260). The PHY layer may transmit an SCI 205 (e.g., SCI 205-a) scheduling or reserving the resource for the sidelink transmission, which may be groupcast or broadcast to one or more other UEs 115 (e.g., UEs 115-b and 115-c).

Figure 3:
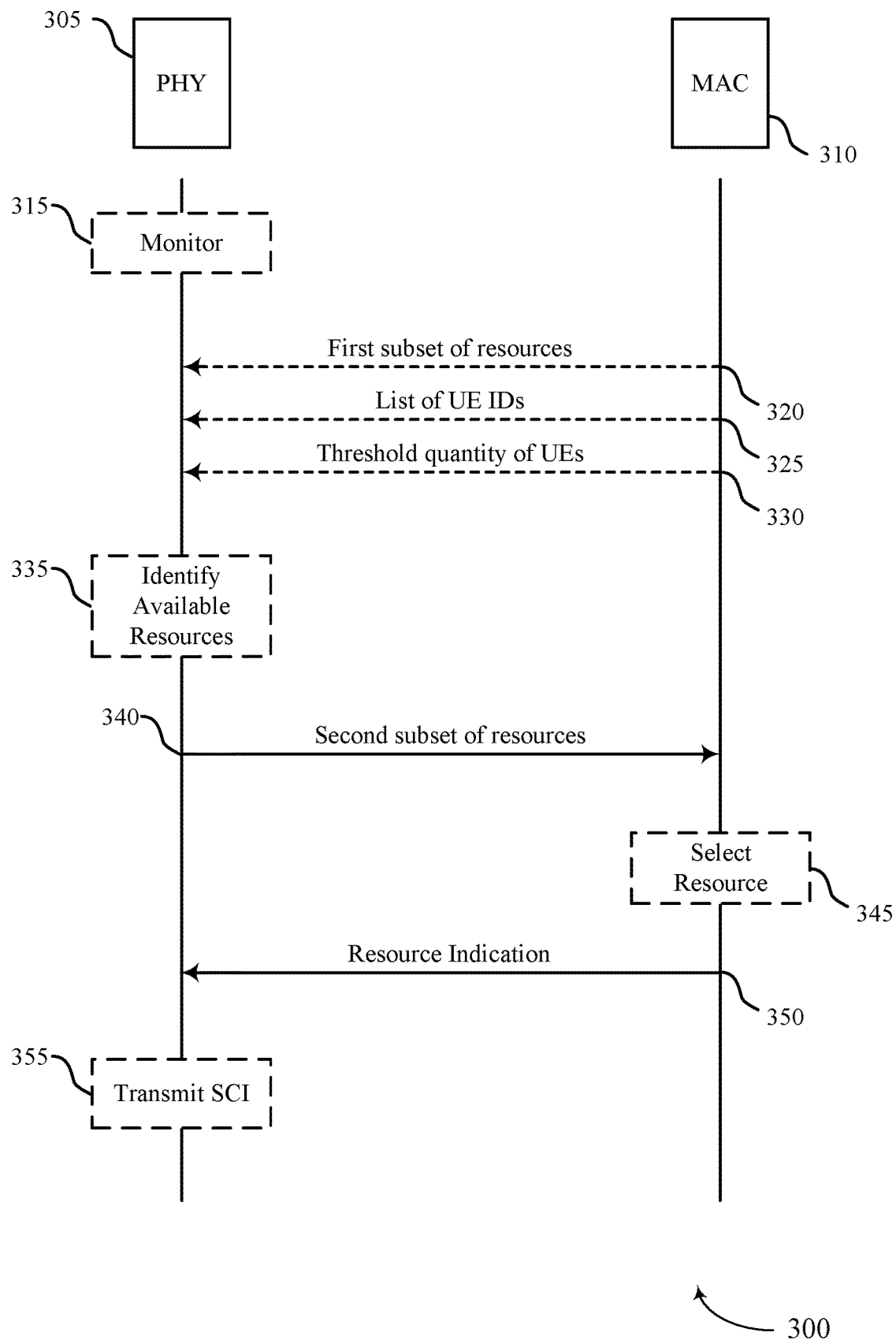
FIG. 3 illustrates an example of a process flow that supports half-duplex-aware resource selection in sidelink in accordance with one or more aspects of the present disclosure.

FIG. 3 illustrates an example of a process flow 300 that supports half-duplex-aware resource selection in sidelink in accordance with one or more aspects of the present disclosure. In some examples, process flow 300 may implement or be implemented by aspects of wireless communications system 100 or 200. For example, process flow 300 may be implemented by a PHY layer 305 and a MAC layer 310 of a first UE 115, which may represent examples of a PHY layer, a MAC layer, and a UE 115 described with reference to FIGS. 1 and 2. Process flow 300 may be implemented by the first UE 115 (e.g., the PHY layer 305 and the MAC layer 310 of the first UE 115), for example, to efficiently select resources for a sidelink transmission that is scheduled to be transmitted by the first UE 115 when operating in a half-duplex mode or received by a second UE 115 operating in a half-duplex mode.

In the following description of process flow 300, the operations may be performed (e.g., reported or provided) in a different order than the order shown, or the operations performed by the first UE 115 (e.g., by the PHY layer 305 and the MAC layer 310) may be performed in different orders or at different times. For example, specific operations may also be left out of process flow 300, or other operations may be added to process flow 300. Although the PHY layer 305 and the MAC layer 310 of the first UE 115 are shown performing the operations of process flow 300, some aspects of some operations may also be performed by one or more other protocol stack layers of the first UE 115 or by one or more wireless devices. For instance, the MAC layer 310 may coordinate (e.g., report or receive an indication of resources to exclude from available resources for a sidelink transmission) with one or more upper layers (e.g., an RRC layer or application layer) to efficiently select resources for a sidelink transmission (e.g., a sidelink transmission to or from a half-duplex UE 115).

At 315, the PHY layer 305 may monitor for SCI transmitted by other UEs 115 (e.g., one or more other UEs 115, including the second UE 115). For example, as described with reference to FIG. 2, the PHY layer may monitor, in a sensing window, for SCI that indicates reserved sidelink resources for the one or more other UEs 115. The SCI may include an SCI-1 message, which may indicate reserved sidelink resources and a priority of an associated communication. The SCI may also include an SCI-2 message, which may be associated with the SCI-1 message and may indicate a transmitting UE ID and a receiving UE ID for the reserved resources.

In some cases, the PHY layer 305 may receive SCI (e.g., SCI-1 and SCI-2) based on monitoring for the SCI and may identify reserved sidelink resources and associated UE ID(s) based on receiving the SCI. The PHY layer 305 may measure an RSRP associated with the received SCI (e.g., SCI-1) (e.g., measure an RSRP of the received SCI or a PSSCH associated with the received SCI). In some cases, the PHY layer 305 may receive and decode SCI-1 but may fail to receive or decode SCI-2, such that the PHY layer 305 may identify reserved sidelink resources but may fail to identify a UE ID associated with the reserved resources.

In some examples, at 320, the PHY layer 305 of the first UE 115 may receive from the MAC layer 310 of the first UE 115 an indication (e.g., explicit indication) of a first subset of a set of resources in which the first UE 115 is scheduled to receive, the second UE 115 is scheduled to transmit, or both. In particular, the MAC layer 310 may explicitly indicate the resources (if any) in the first subset of resources in which the first UE 115 is scheduled to receive. Further, in some cases, the MAC layer 310 may also explicitly indicate the resources (if any) in the first subset of resources in which the second UE 115 is scheduled to transmit. In other cases, the MAC layer 310 may implicitly indicate the resources (if any) in the first subset of resources in which the second UE 115 is scheduled to transmit.

In other examples, at 325, the MAC layer 310 may provide, and the PHY layer 305 may receive, a list of one or more UE IDs identifying a list of one or more UEs 115 scheduled to transmit data to or receive data from the first UE 115. The list of UEs 115 may include the second UE 115. The PHY layer 305 may then identify resources in the first subset of resources reserved by the list of UEs 115, and the PHY layer 305 may determine that each UE in the list of UEs 115 is scheduled to transmit on resources reserved by the UE 115. For instance, the PHY layer 305 may identify that at least one resource of the first subset of resources is reserved by the second UE 115, and the PHY layer 305 may determine that the second UE 115 is scheduled to transmit on the at least one resource based on identifying that the at least one resource is reserved by the second UE. The indication of the list of one or more UEs 115 may be referred to as an implicit indication of the first subset of resources since the PHY layer may use the list of one or more UEs 115 to identify the first subset of resources.

In yet other examples, at 330, the MAC layer 310 may provide, and the PHY layer 305 may receive, an indication of a threshold quantity of UEs 115. In this example, if the PHY layer 305 identifies that at least the threshold quantity of UEs 115 are scheduled to transmit on at least one resource of the first subset of resources, the PHY layer 305 may identify that the at least one resource of the first subset of resources is unavailable for the sidelink transmission. The sidelink transmission may be a groupcast or broadcast transmission. Accordingly, if the threshold quantity of UEs 115 are scheduled to transmit on the at least one resource, the threshold quantity of UEs 115 may be unable to receive the sidelink transmission on the at least one resource. Thus, the at least one resource may be in the first subset of resources excluded from resources available for the sidelink transmission. The indication of the threshold quantity of UEs 115 may be referred to as an implicit indication of the first subset of resources since the PHY layer may use the threshold quantity of UEs 115 to identify the first subset of resources.

At 335, the PHY layer 305 may identify a second subset of the set of resources available for the sidelink transmission based on SCI, a set of parameters (e.g., for selecting resources), and the first subset of resources, and, at 340, the PHY layer 305 may report, and the MAC layer 310 may receive, the second subset of resources. The set of parameters may indicate a threshold percentage of the set of resources to report as available for the sidelink transmission, a priority of the sidelink transmission, an RSRP threshold for selecting resources, or a combination thereof.

In some cases, the PHY layer 305 may report, and the MAC layer 310 may receive, at least the threshold percentage of the set of resources, where the first subset of resources is excluded from the at least the threshold percentage of the set of resources. That is, regardless of whether the RSRP of the SCI or RSRP of a PSSCH associated with the SCI used to schedule the transmissions on the first subset of resources is below an RSRP threshold, the first subset of resources may be excluded from the at least the threshold percentage of the set of resources indicated as available for the sidelink transmission. The threshold percentage may be based on a size of the first subset of resources. For example, the threshold percentage may be a first threshold percentage (Y) and may correspond to a maximum of two values. The two values may include a first value corresponding to a minimum of a second threshold percentage (X) and a second value corresponding to the second threshold percentage (X) multiplied by a scaling factor, where the scaling factor is based on the size of the first subset of resources.

In other cases, the PHY layer 305 may report, and the MAC layer 310 may receive, at least the threshold percentage of all resources in the set of resources excluding the first subset of resources. That is, the resources from which the threshold percentage is computed may exclude the first subset of resources. Regardless of whether the first subset of resources is excluded from the threshold percentage of resources indicated as available or the first subset of resources fails to contribute to the threshold percentage, the PHY layer 305 may still report resources in the first subset of resources for the sidelink transmission. That is, if the RSRP of the SCI or RSRP of a PSSCH associated with the SCI used to schedule transmissions on resources in the first subset of resources is below an RSRP threshold, the PHY layer 305 may report these resources for the sidelink transmission.

In some examples, if the PHY layer 305 reports one or more resources in the first subset of resources for the sidelink transmission, the PHY layer 305 may report a UE ID with each reserved resource identifying a UE that reserved the resource. The MAC layer 310 may then perform resource selection or filtering (e.g., for the sidelink transmission) based on the UE ID for each excluded resource. That is, the one or more resources may be available for the sidelink transmission from the perspective of the PHY layer 305 but may be unavailable for the sidelink transmission from the perspective of the MAC layer 310. Thus, the MAC layer may avoid selecting a resource for the sidelink transmission from the one or more resources in the first subset of resources.

At 345, the MAC layer 310 may select a resource for the sidelink transmission from the first UE based on receiving the second subset of resources available for the sidelink transmission from the PHY layer 305. At 350, the MAC layer 310 may provide, and the PHY layer 305 may receive, an indication of the selected resource for the sidelink transmission in response to reporting the second subset of resources available for the sidelink transmission. At 355, the PHY layer 305 may transmit an SCI based on the resource indicated by the MAC layer 310. For example, the SCI may include a grant or other indication reserving the resource for the sidelink transmission, and the PHY layer 305 may transmit the SCI in a broadcast or groupcast manner to indicate the reservation to one or more other UEs 115. The first UE 115 may then transmit the sidelink transmission to the second UE on the selected resource in accordance with the SCI.

Figure 4:
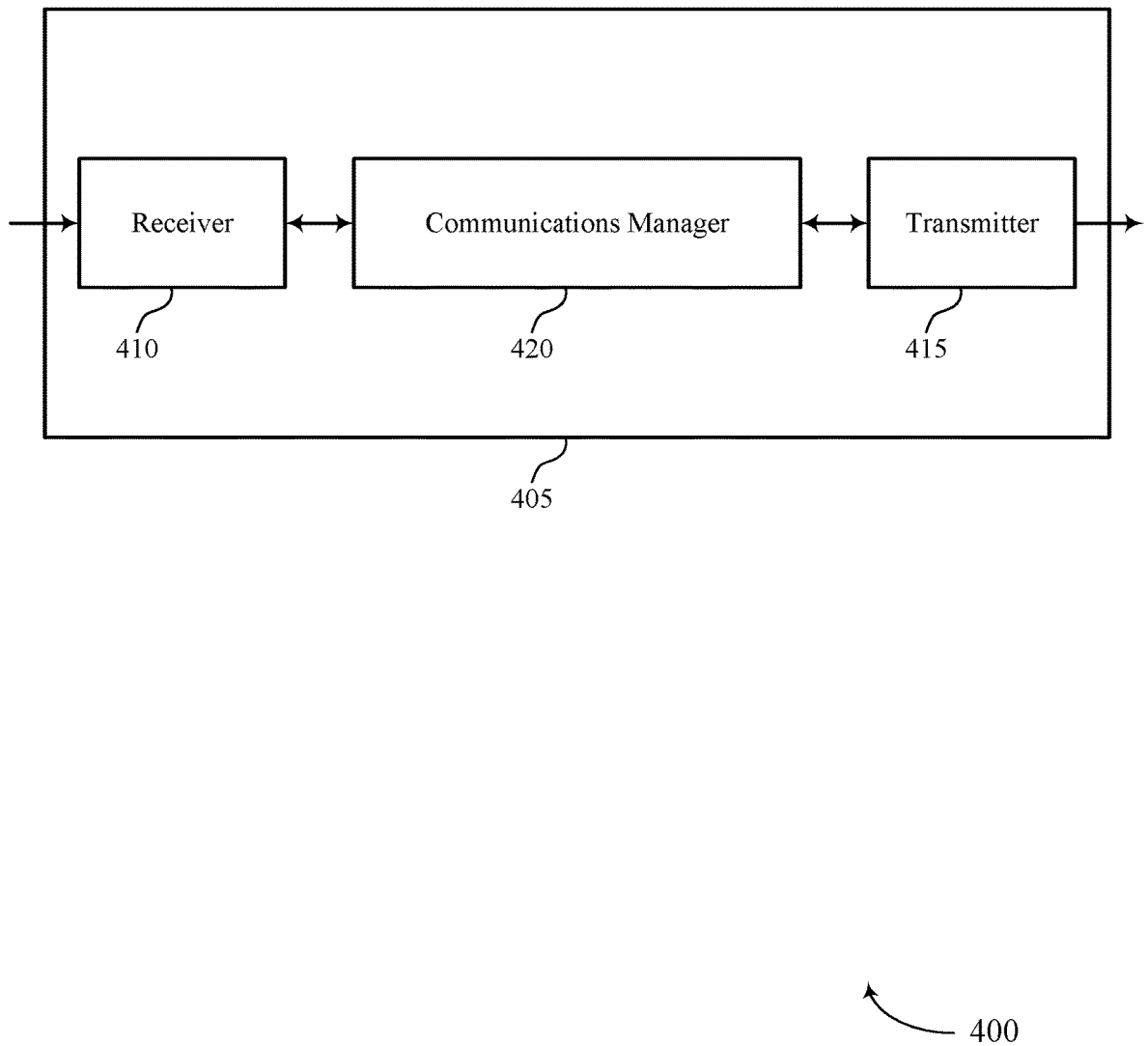
FIGS. 4 and 5 show block diagrams of devices that support half-duplex-aware resource selection in sidelink in accordance with one or more aspects of the present disclosure.

FIG. 4 shows a block diagram 400 of a device 405 that supports half-duplex-aware resource selection in sidelink in accordance with one or more aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to half-duplex-aware resource selection in sidelink). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to half-duplex-aware resource selection in sidelink). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of half-duplex-aware resource selection in sidelink as described herein. For example, the communications manager 420, the receiver 410, the transmitter 415, or various combinations or components thereof may support a method for performing one or more of the functions described herein.

The communications manager 420 may be an example of means for performing various aspects of managing sidelink resources as described herein. In some examples, the communications manager 420, the receiver 410, the transmitter 415, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 420 may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support wireless communication at a first UE in accordance with examples as disclosed herein. For example, the communications manager 420 may be configured as or otherwise support a means for receiving, at a first protocol stack layer of the first UE from a second protocol stack layer of the first UE, an indication of a set of parameters. The communications manager 420 may be configured as or otherwise support a means for receiving, from the second protocol stack layer of the first UE, an indication of a first subset of resources in which the first UE is scheduled to receive, a second UE is scheduled to transmit, or both. The communications manager 420 may be configured as or otherwise support a means for reporting, to the second protocol stack layer of the first UE, a second subset of resources for a sidelink transmission basing at least in part on sidelink control information, the set of parameters, and the first subset of resources. The communications manager 420 may be configured as or otherwise support a means for receiving, from the second protocol stack layer, an indication of a resource for the sidelink transmission in response to reporting the second subset of resources for the sidelink transmission.

Additionally, or alternatively, the communications manager 420 may support wireless communication at a first UE in accordance with examples as disclosed herein. For example, the communications manager 420 may be configured as or otherwise support a means for providing, to a first protocol stack layer of the first UE from a second protocol stack layer of the first UE, an indication of a set of parameters. The communications manager 420 may be configured as or otherwise support a means for providing, to the first protocol stack layer of the first UE, an indication of a first subset of resources in which the first UE is scheduled to receive, a second UE is scheduled to transmit, or both. The communications manager 420 may be configured as or otherwise support a means for receiving, from the first protocol stack layer of the first UE, a second subset of resources for a sidelink transmission based on sidelink control information, the set of parameters, and the first subset of resources. The communications manager 420 may be configured as or otherwise support a means for providing, to the first protocol stack layer, an indication of a resource for the sidelink transmission in response to receiving the second subset of resources for the sidelink transmission.

By including or configuring the communications manager 420 in accordance with examples as described herein, the device 405 (e.g., a processor controlling or otherwise coupled to the receiver 410, the transmitter 415, the communications manager 420, or a combination thereof) may support techniques for increasing battery life and communication quality at a wireless device (e.g., a UE 115). In particular, the techniques described herein may prevent a half-duplex UE from being scheduled for full-duplex communications, which may improve battery life since the half-duplex UE may not have to be rescheduled for transmitting or receiving sidelink transmissions that failed due to the half-duplex UE being scheduled for full-duplex communications.

Figure 5:
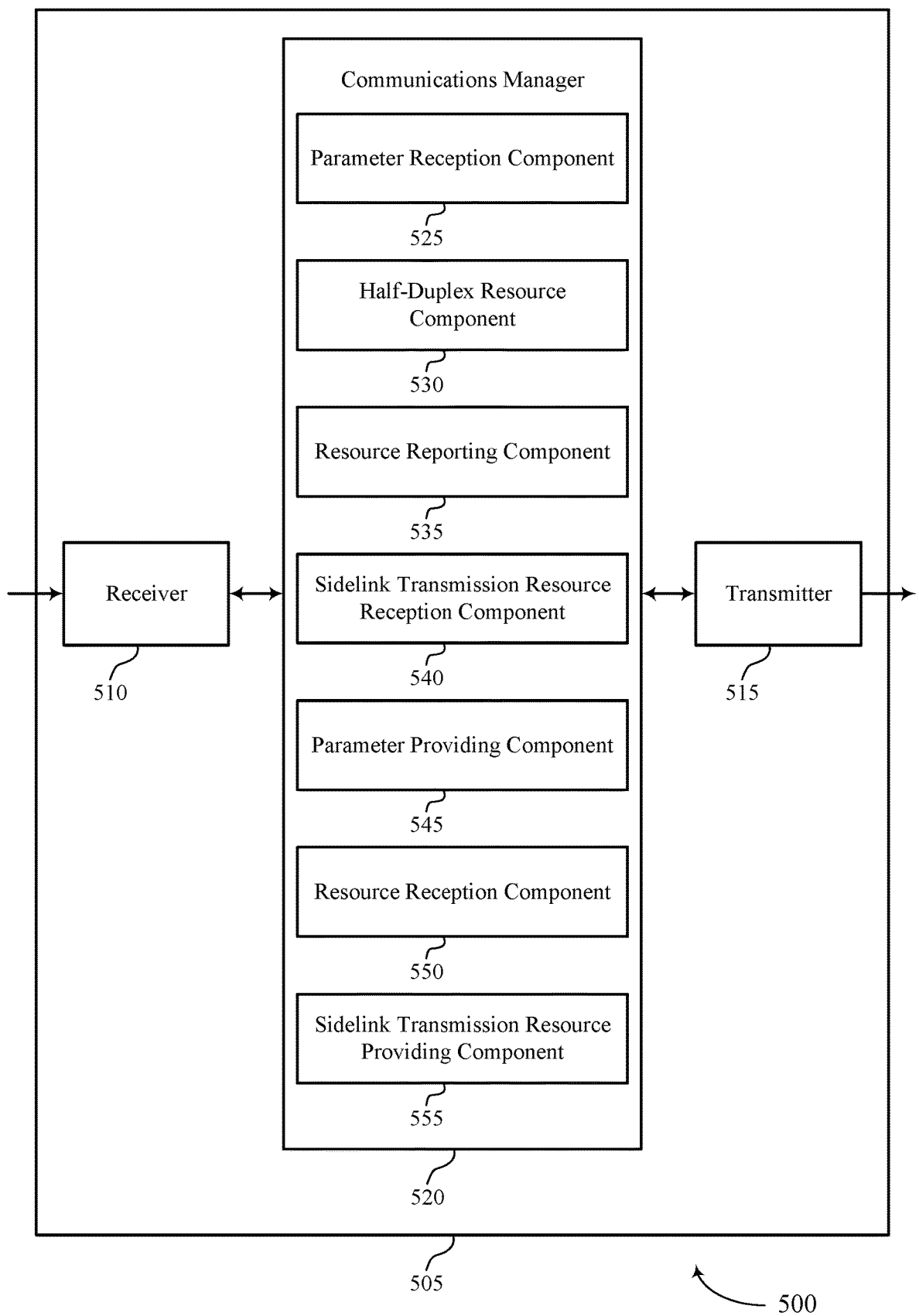

FIG. 5 shows a block diagram 500 of a device 505 that supports half-duplex-aware resource selection in sidelink in accordance with one or more aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to half-duplex-aware resource selection in sidelink). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to half-duplex-aware resource selection in sidelink). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of half-duplex-aware resource selection in sidelink as described herein. For example, the communications manager 520 may include a parameter reception component 525, a half-duplex resource component 530, a resource reporting component 535, a sidelink transmission resource reception component 540, a parameter providing component 545, a resource reception component 550, a sidelink transmission resource providing component 555, or any combination thereof. The communications manager 520 may be an example of aspects of a communications manager 420 as described herein. In some examples, the communications manager 520, or various components thereof, may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a first UE in accordance with examples as disclosed herein. The parameter reception component 525 may be configured as or otherwise support a means for receiving, at a first protocol stack layer of the first UE from a second protocol stack layer of the first UE, an indication of a set of parameters. The half-duplex resource component 530 may be configured as or otherwise support a means for receiving, from the second protocol stack layer of the first UE, an indication of a first subset of resources in which the first UE is scheduled to receive, a second UE is scheduled to transmit, or both. The resource reporting component 535 may be configured as or otherwise support a means for reporting, to the second protocol stack layer of the first UE, a second subset of resources for a sidelink transmission based on sidelink control information, the set of parameters, and the first subset of resources. The sidelink transmission resource reception component 540 may be configured as or otherwise support a means for receiving, from the second protocol stack layer, an indication of a resource for the sidelink transmission in response to reporting the second subset of resources for the sidelink transmission.

Additionally, or alternatively, the communications manager 520 may support wireless communication at a first UE in accordance with examples as disclosed herein. The parameter providing component 545 may be configured as or otherwise support a means for providing, to a first protocol stack layer of the first UE from a second protocol stack layer of the first UE, an indication of a set of parameters. The half-duplex resource component 530 may be configured as or otherwise support a means for providing, to the first protocol stack layer of the first UE, an indication of a first subset of resources in which the first UE is scheduled to receive, a second UE is scheduled to transmit, or both. The resource reception component 550 may be configured as or otherwise support a means for receiving, from the first protocol stack layer of the first UE, a second subset of resources for a sidelink transmission based on sidelink control information, the set of parameters, and the first subset of resources. The sidelink transmission resource providing component 555 may be configured as or otherwise support a means for providing, to the first protocol stack layer, an indication of a resource for the sidelink transmission in response to receiving the second subset of resources for the sidelink transmission.

Figure 6:
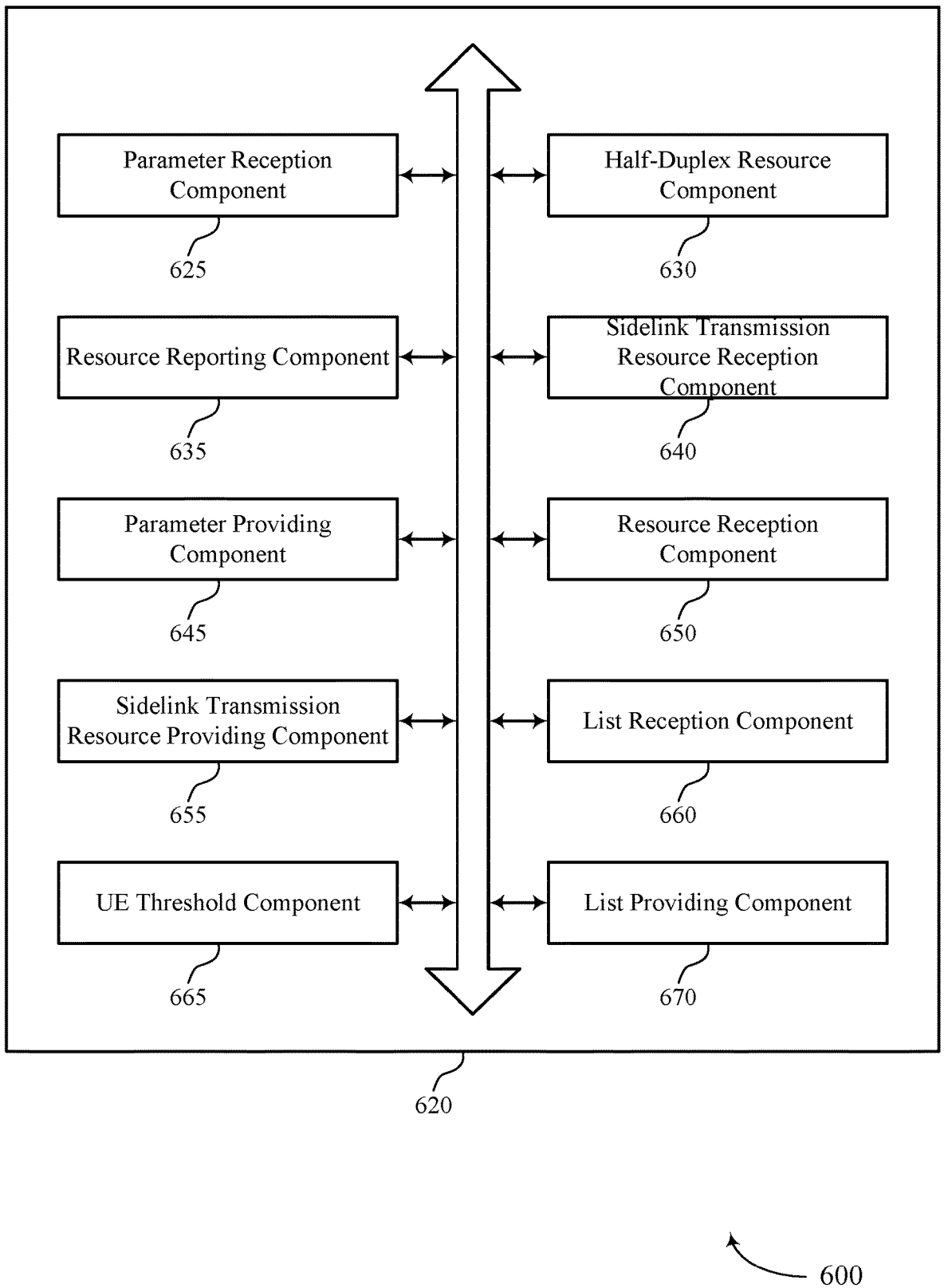
FIG. 6 shows a block diagram of a communications manager that supports half-duplex-aware resource selection in sidelink in accordance with one or more aspects of the present disclosure.

FIG. 6 shows a block diagram 600 of a communications manager 620 that supports half-duplex-aware resource selection in sidelink in accordance with one or more aspects of the present disclosure. The communications manager 620 may be an example of aspects of a communications manager 420, a communications manager 520, or both, as described herein. The communications manager 620, or various components thereof, may be an example of means for performing various aspects of half-duplex-aware resource selection in sidelink as described herein. For example, the communications manager 620 may include a parameter reception component 625, a half-duplex resource component 630, a resource reporting component 635, a sidelink transmission resource reception component 640, a parameter providing component 645, a resource reception component 650, a sidelink transmission resource providing component 655, a list reception component 660, a UE threshold component 665, a list providing component 670, or any combination thereof. Each of these components may communicate, directly or indirectly, with one another (e.g., via one or more buses).

The communications manager 620 may support wireless communication at a first UE in accordance with examples as disclosed herein. The parameter reception component 625 may be configured as or otherwise support a means for receiving, at a first protocol stack layer of the first UE from a second protocol stack layer of the first UE, an indication of a set of parameters. The half-duplex resource component 630 may be configured as or otherwise support a means for receiving, from the second protocol stack layer of the first UE, an indication of a first subset of resources in which the first UE is scheduled to receive, a second UE is scheduled to transmit, or both. The resource reporting component 635 may be configured as or otherwise support a means for reporting, to the second protocol stack layer of the first UE, a second subset of resources for a sidelink transmission based on sidelink control information, the set of parameters, and the first subset of resources. The sidelink transmission resource reception component 640 may be configured as or otherwise support a means for receiving, from the second protocol stack layer, an indication of a resource for the sidelink transmission in response to reporting the second subset of resources for the sidelink transmission.

In some examples, to support reporting the second subset of resources for the sidelink transmission, the resource reporting component 635 may be configured as or otherwise support a means for reporting at least a threshold percentage of a set of resources, where the first subset of resources is excluded from the at least the threshold percentage of the set of resources. In some examples, the threshold percentage is based on a size of the first subset of resources. In some examples, the threshold percentage includes a first threshold percentage and corresponds to a maximum of two values. In such examples, the two values include a first value corresponding to a minimum of a second threshold percentage of the set of resources to be reported and a second value corresponding to the second threshold percentage multiplied by a scaling factor, wherein the scaling factor is based at least in part on the size of the first subset of resources.

In some examples, to support reporting the second subset of resources for the sidelink transmission, the resource reporting component 635 may be configured as or otherwise support a means for reporting at least a threshold percentage of all resources in a set of resources excluding the first subset of resources. In some examples, the half-duplex resource component 630 may be configured as or otherwise support a means for reporting, to the second protocol stack layer of the first UE, one or more resources in the first subset of resources for the sidelink transmission.

In some examples, to support receiving the indication of the first subset of resources in which the first UE is scheduled to receive, the second UE is scheduled to transmit, or both, the list reception component 660 may be configured as or otherwise support a means for receiving a list of one or more UEs scheduled to transmit data to or receive data from the first UE, where the list of one or more UEs includes the second UE. In some examples, to support receiving the indication of the first subset of resources in which the first UE is scheduled to receive, the second UE is scheduled to transmit, or both, the half-duplex resource component 630 may be configured as or otherwise support a means for identifying that at least one resource of the first subset of resources is reserved by the second UE. In some examples, to support receiving the indication of the first subset of resources in which the first UE is scheduled to receive, the second UE is scheduled to transmit, or both, the half-duplex resource component 630 may be configured as or otherwise support a means for determining that the second UE is scheduled to transmit on the at least one resource based on identifying that the at least one resource is reserved by the second UE.

In some examples, the resource reporting component 635 may be configured as or otherwise support a means for reporting, to the second protocol stack layer of the first UE, one or more resources reserved by the UEs in the list, where the first subset of resources includes the one or more resources. In some examples, the resource reporting component 635 may be configured as or otherwise support a means for reporting a UE identifier with each of the one or more resources, the UE identifier identifying a UE in the list that reserved the resource.

In some examples, the UE threshold component 665 may be configured as or otherwise support a means for receiving, from the second protocol stack layer of the first UE, a threshold quantity of UEs. In some examples, the UE threshold component 665 may be configured as or otherwise support a means for identifying that at least the threshold quantity of UEs are scheduled to transmit on at least one resource of the first subset of resources. In some examples, to report the second subset of resources for the sidelink transmission, the resource reporting component 635 may be configured as or otherwise support a means for reporting the second subset of resources for the sidelink transmission based on the threshold quantity of UEs being scheduled to transmit in the at least one resource, where the at least one resource is excluded from the second subset of resources.

In some examples, to support reporting the second subset of resources for the sidelink transmission, the resource reporting component 635 may be configured as or otherwise support a means for reporting at least a threshold percentage of a set of resources for the sidelink transmission after excluding the at least one resource. In some examples, the sidelink transmission includes a groupcast or broadcast transmission. In some examples, the set of parameters includes a threshold percentage of a set of resources to report for the sidelink transmission, a priority of the sidelink transmission, a reference signal received power threshold for selecting resources, or a combination thereof.

Additionally, or alternatively, the communications manager 620 may support wireless communication at a first UE in accordance with examples as disclosed herein. The parameter providing component 645 may be configured as or otherwise support a means for providing, to a first protocol stack layer of the first UE from a second protocol stack layer of the first UE, an indication of a set of parameters. In some examples, the half-duplex resource component 630 may be configured as or otherwise support a means for providing, to the first protocol stack layer of the first UE, an indication of a first subset of resources in which the first UE is scheduled to receive, a second UE is scheduled to transmit, or both. The resource reception component 650 may be configured as or otherwise support a means for receiving, from the first protocol stack layer of the first UE, a second subset of resources for a sidelink transmission based on sidelink control information, the set of parameters, and the first subset of resources. The sidelink transmission resource providing component 655 may be configured as or otherwise support a means for providing, to the first protocol stack layer, an indication of a resource for the sidelink transmission in response to receiving the second subset of resources for the sidelink transmission.

In some examples, to support receiving the second subset of resources for the sidelink transmission, the resource reception component 650 may be configured as or otherwise support a means for receiving at least a threshold percentage of a set of resources, where the first subset of resources is excluded from the at least the threshold percentage of the set of resources. In some examples, the threshold percentage is based on a size of the first subset of resources. In some examples, the threshold percentage includes a first threshold percentage and corresponds to a maximum of two values. In such examples, the two values include a first value corresponding to a minimum of a second threshold percentage of the set of resources to be reported and a second value corresponding to the second threshold percentage multiplied by a scaling factor, wherein the scaling factor is based at least in part on the size of the first subset of resources.

In some examples, to support receiving the second subset of resources for the sidelink transmission, the resource reception component 650 may be configured as or otherwise support a means for receiving at least a threshold percentage of all resources in a set of resources excluding the first subset of resources. In some examples, the half-duplex resource component 630 may be configured as or otherwise support a means for receiving, from the first protocol stack layer, one or more resources in the first subset of resources for the sidelink transmission. The sidelink transmission resource providing component 655 may avoid selecting the resource for the sidelink transmission from the one or more resources in the first subset of resources based at least in part on the first UE being scheduled to receive on the one or more resources, the second UE being scheduled to transmit on the one or more resources, or both.

In some examples, to support providing the indication of the first subset of resources in which the first UE is scheduled to receive, the second UE is scheduled to transmit, or both, the list providing component 670 may be configured as or otherwise support a means for providing a list of one or more UEs scheduled to transmit data to or receive data from the first UE, where the list of one or more UEs includes the second UE, and at least one resource of the first subset of resources is reserved by the second UE.

In some examples, the resource reception component 650 may be configured as or otherwise support a means for receiving an indication of one or more resources reserved by the UEs in the list, where the first subset of resources includes the one or more resources. In some examples, the resource reception component 650 may be configured as or otherwise support a means for receiving a UE identifier with each of the one or more resources, the UE identifier identifying a UE in the list that reserved the resource.

In some examples, the UE threshold component 665 may be configured as or otherwise support a means for providing, to the first protocol stack layer of the first UE, a threshold quantity of UEs. In some examples, to receive the second subset of resources for the sidelink transmission, the resource reception component 650 may be configured as or otherwise support a means for receiving the second subset of resources for the sidelink transmission based on providing the threshold quantity of UEs, where at least one resource of the first subset of resources is excluded from the second subset of resources based on the threshold quantity of UEs being scheduled to transmit in the at least one resource.

In some examples, to support receiving the second subset of resources for the sidelink transmission, the resource reception component 650 may be configured as or otherwise support a means for receiving at least a threshold percentage of a set of resources for the sidelink transmission after the first subset of resources is excluded. In some examples, the sidelink transmission includes a groupcast or broadcast transmission. In some examples, the set of parameters includes a threshold percentage of a set of resources to report for the sidelink transmission, a priority of the sidelink transmission, a reference signal received power threshold for selecting resources, or a combination thereof.

Figure 7:
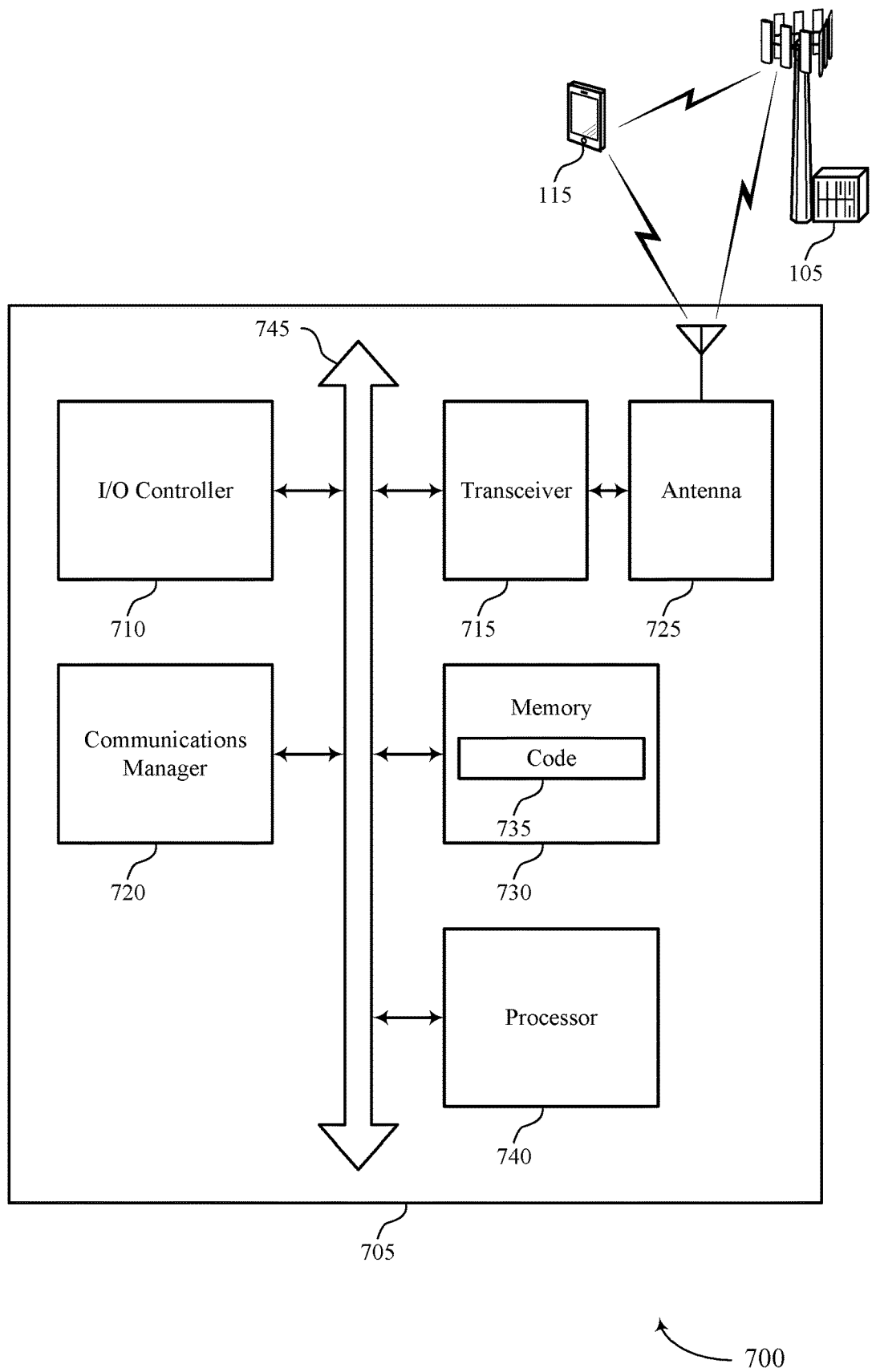
FIG. 7 shows a diagram of a system including a device that supports half-duplex-aware resource selection in sidelink in accordance with one or more aspects of the present disclosure.

FIG. 7 shows a diagram of a system 700 including a device 705 that supports half-duplex-aware resource selection in sidelink in accordance with one or more aspects of the present disclosure. The device 705 may be an example of or include the components of a device 405, a device 505, or a UE 115 as described herein. The device 705 may communicate wirelessly with one or more base stations 105, UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting half-duplex-aware resource selection in sidelink). For example, the device 705 or a component of the device 705 may include a processor 740 and memory 730 coupled to the processor 740, the processor 740 and memory 730 configured to perform various functions described herein.

The communications manager 720 may support wireless communication at a first UE in accordance with examples as disclosed herein. For example, the communications manager 720 may be configured as or otherwise support a means for receiving, at a first protocol stack layer of the first UE from a second protocol stack layer of the first UE, an indication of a set of parameters. The communications manager 720 may be configured as or otherwise support a means for receiving, from the second protocol stack layer of the first UE, an indication of a first subset of resources in which the first UE is scheduled to receive, a second UE is scheduled to transmit, or both. The communications manager 720 may be configured as or otherwise support a means for reporting, to the second protocol stack layer of the first UE, a second subset of resources for a sidelink transmission basing at least in part on sidelink control information, the set of parameters, and the first subset of resources. The communications manager 720 may be configured as or otherwise support a means for receiving, from the second protocol stack layer, an indication of a resource for the sidelink transmission in response to reporting the second subset of resources for the sidelink transmission.

Additionally, or alternatively, the communications manager 720 may support wireless communication at a first UE in accordance with examples as disclosed herein. For example, the communications manager 720 may be configured as or otherwise support a means for providing, to a first protocol stack layer of the first UE from a second protocol stack layer of the first UE, an indication of a set of parameters. The communications manager 720 may be configured as or otherwise support a means for providing, to the first protocol stack layer of the first UE, an indication of a first subset of resources in which the first UE is scheduled to receive, a second UE is scheduled to transmit, or both. The communications manager 720 may be configured as or otherwise support a means for receiving, from the first protocol stack layer of the first UE, a second subset of resources for a sidelink transmission based on sidelink control information, the set of parameters, and the first subset of resources. The communications manager 720 may be configured as or otherwise support a means for providing, to the first protocol stack layer, an indication of a resource for the sidelink transmission in response to receiving the second subset of resources for the sidelink transmission.

By including or configuring the communications manager 720 in accordance with examples as described herein, the device 705 may support techniques for increasing battery life and communication quality at a wireless device (e.g., a UE 115). In particular, the techniques described herein may prevent a half-duplex UE from being scheduled for full-duplex communications, which may improve battery life since the half-duplex UE may not have to be rescheduled for transmitting or receiving sidelink transmissions that failed due to the half-duplex UE being scheduled for full-duplex communications.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of half-duplex-aware resource selection in sidelink as described herein, or the processor 740 and the memory 730 may be otherwise configured to perform or support such operations.

Figure 8:
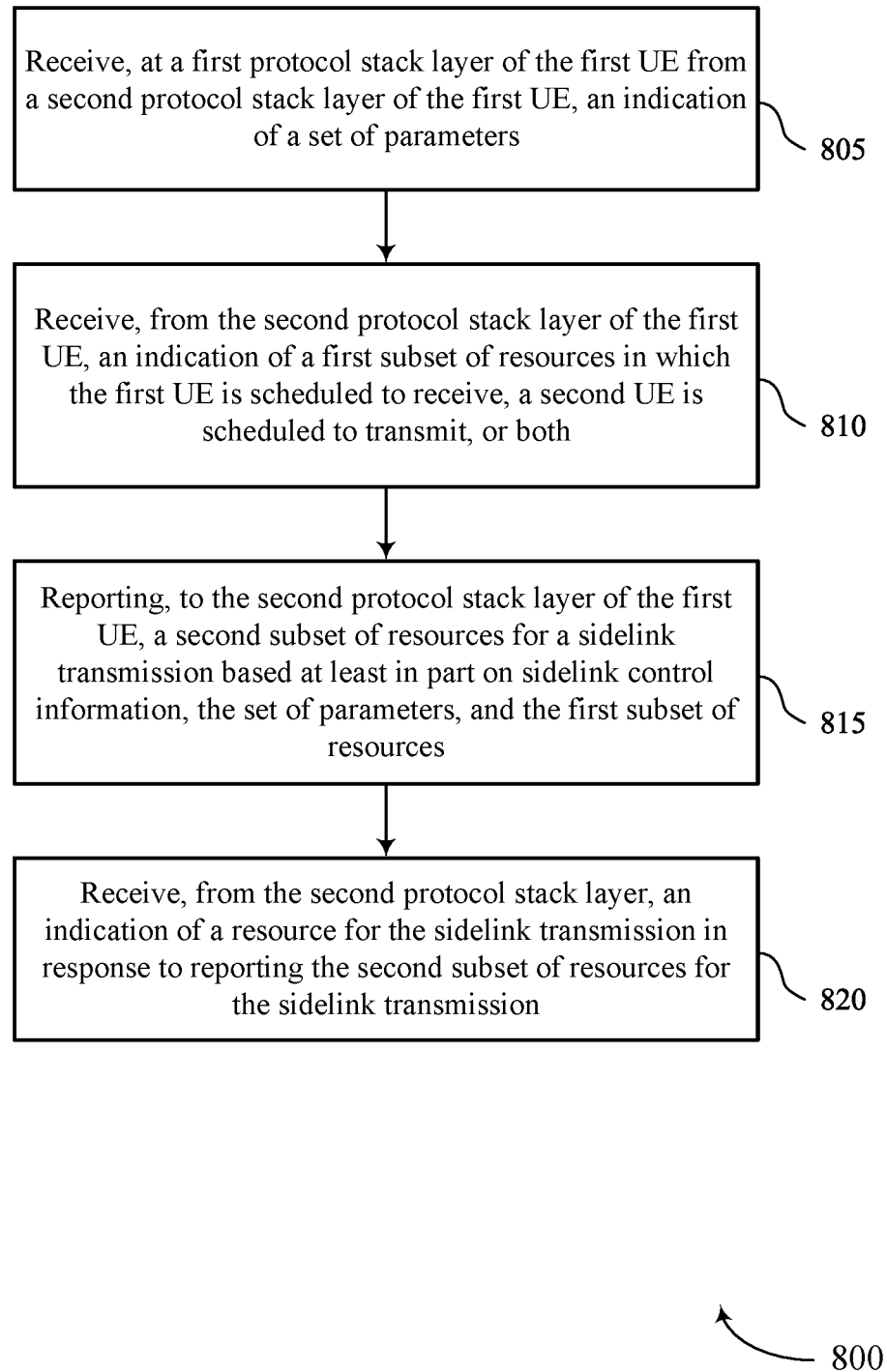
FIGS. 8 and 9 show flowcharts illustrating methods that support half-duplex-aware resource selection in sidelink in accordance with one or more aspects of the present disclosure.

FIG. 8 shows a flowchart illustrating a method 800 that supports half-duplex-aware resource selection in sidelink in accordance with one or more aspects of the present disclosure. The operations of the method 800 may be implemented by a UE or its components as described herein. For example, the operations of the method 800 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 805, the method may include receiving, at a first protocol stack layer of the first UE from a second protocol stack layer of the first UE, an indication of a set of parameters. The operations of 805 may be performed in accordance with examples as disclosed herein. In some examples, aspects of the operations of 805 may be performed by a parameter reception component 625 as described with reference to FIG. 6.

At 810, the method may include receiving, from the second protocol stack layer of the first UE, an indication of a first subset of resources in which the first UE is scheduled to receive, a second UE is scheduled to transmit, or both. The operations of 810 may be performed in accordance with examples as disclosed herein. In some examples, aspects of the operations of 810 may be performed by a half-duplex resource component 630 as described with reference to FIG. 6.

At 815, the method may include reporting, to the second protocol stack layer of the first UE, a second subset of resources for a sidelink transmission based on sidelink control information, the set of parameters, and the first subset of resources. The operations of 815 may be performed in accordance with examples as disclosed herein. In some examples, aspects of the operations of 815 may be performed by a resource reporting component 635 as described with reference to FIG. 6.

At 820, the method may include receiving, from the second protocol stack layer, an indication of a resource for the sidelink transmission in response to reporting the second subset of resources for the sidelink transmission. The operations of 820 may be performed in accordance with examples as disclosed herein. In some examples, aspects of the operations of 820 may be performed by a sidelink transmission resource reception component 640 as described with reference to FIG. 6.

Figure 9:
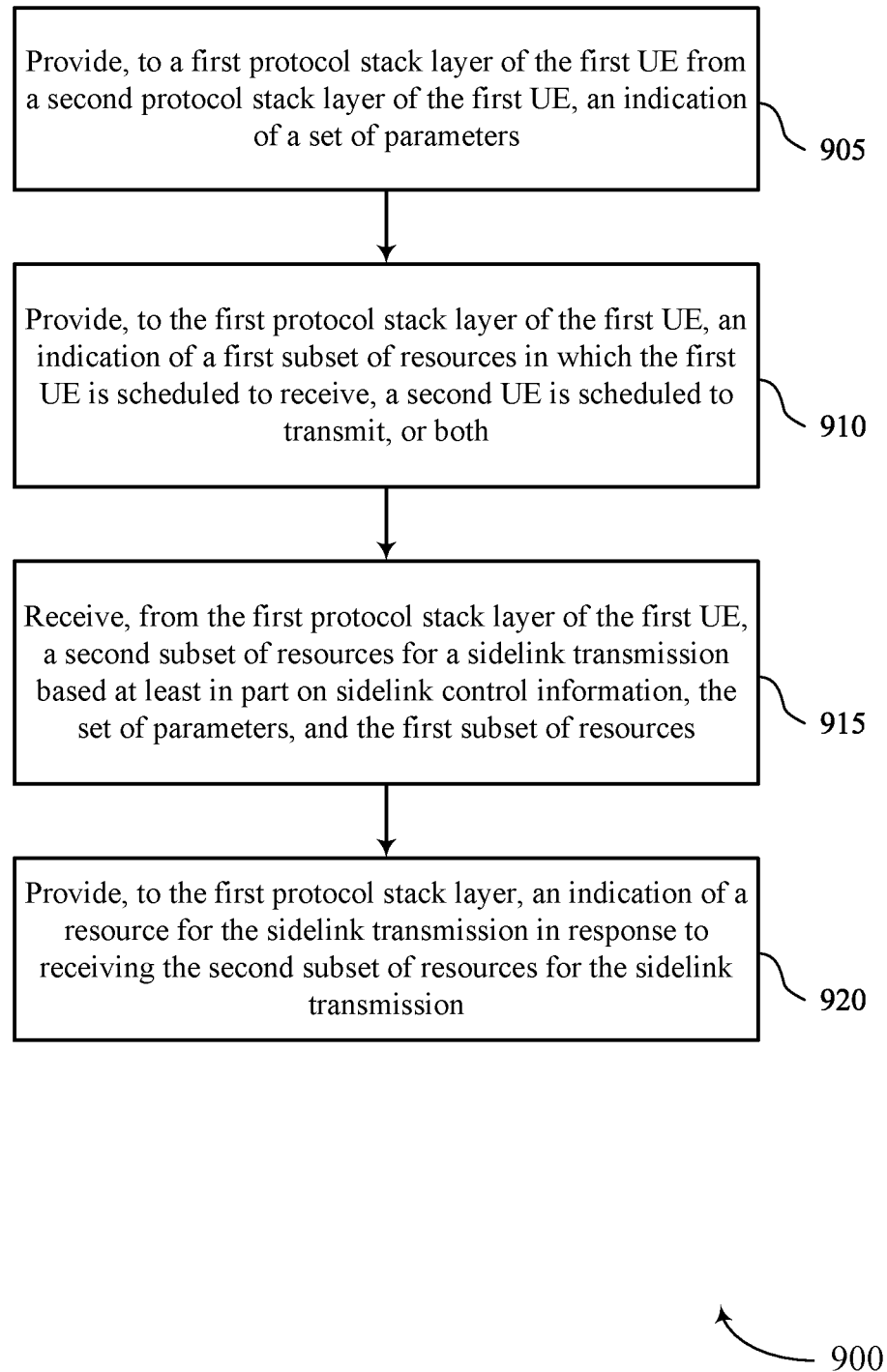

FIG. 9 shows a flowchart illustrating a method 900 that supports half-duplex-aware resource selection in sidelink in accordance with one or more aspects of the present disclosure. The operations of the method 900 may be implemented by a UE or its components as described herein. For example, the operations of the method 900 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 905, the method may include providing, to a first protocol stack layer of the first UE from a second protocol stack layer of the first UE, an indication of a set of parameters. The operations of 905 may be performed in accordance with examples as disclosed herein. In some examples, aspects of the operations of 905 may be performed by a parameter providing component 645 as described with reference to FIG. 6.

At 910, the method may include providing, to the first protocol stack layer of the first UE, an indication of a first subset of resources in which the first UE is scheduled to receive, a second UE is scheduled to transmit, or both. The operations of 910 may be performed in accordance with examples as disclosed herein. In some examples, aspects of the operations of 910 may be performed by a half-duplex resource component 630 as described with reference to FIG. 6.

At 915, the method may include receiving, from the first protocol stack layer of the first UE, a second subset of resources for a sidelink transmission based on sidelink control information, the set of parameters, and the first subset of resources. The operations of 915 may be performed in accordance with examples as disclosed herein. In some examples, aspects of the operations of 915 may be performed by a resource reception component 650 as described with reference to FIG. 6.

At 920, the method may include providing, to the first protocol stack layer, an indication of a resource for the sidelink transmission in response to receiving the second subset of resources for the sidelink transmission. The operations of 920 may be performed in accordance with examples as disclosed herein. In some examples, aspects of the operations of 920 may be performed by a sidelink transmission resource providing component 655 as described with reference to FIG. 6.

The following provides an overview of aspects of the present disclosure:

Aspect 1: A method for wireless communication at a first UE, comprising: receiving, at a first protocol stack layer of the first UE from a second protocol stack layer of the first UE, an indication of a set of parameters; receiving, from the second protocol stack layer of the first UE, an indication of a first subset of resources in which the first UE is scheduled to receive, a second UE is scheduled to transmit, or both; reporting, to the second protocol stack layer of the first UE, a second subset of resources for a sidelink transmission based at least in part on sidelink control information, the set of parameters, and the first subset of resources; and receiving, from the second protocol stack layer, an indication of a resource for the sidelink transmission in response to reporting the second subset of resources for the sidelink transmission.

Aspect 2: The method of aspect 1, wherein reporting the second subset of resources for the sidelink transmission comprises: reporting at least a threshold percentage of a set of resources, wherein the first subset of resources is excluded from the at least the threshold percentage of the set of resources.

Aspect 3: The method of aspect 2, wherein the threshold percentage is based at least in part on a size of the first subset of resources.

Aspect 4: The method of aspect 3, wherein the threshold percentage comprises a first threshold percentage and corresponds to a maximum of two values, the two values comprising: a first value corresponding to a minimum of a second threshold percentage of the set of resources to be reported; and a second value corresponding to the second threshold percentage multiplied by a scaling factor, wherein the scaling factor is based at least in part on the size of the first subset of resources.

Aspect 5: The method of any of aspects 1 through 4, wherein reporting the second subset of resources for the sidelink transmission comprises: reporting at least a threshold percentage of all resources in a set of resources excluding the first subset of resources.

Aspect 6: The method of aspect 5, further comprising: reporting, to the second protocol stack layer of the first UE, one or more resources in the first subset of resources for the sidelink transmission.

Aspect 7: The method of any of aspects 1 through 6, wherein receiving the indication of the first subset of resources in which the first UE is scheduled to receive, the second UE is scheduled to transmit, or both comprises: receiving a list of one or more UEs scheduled to transmit data to or receive data from the first UE, wherein the list of one or more UEs comprises the second UE; identifying that at least one resource of the first subset of resources is reserved by the second UE; and determining that the second UE is scheduled to transmit on the at least one resource based at least in part on identifying that the at least one resource is reserved by the second UE.

Aspect 8: The method of aspect 7, further comprising: reporting, to the second protocol stack layer of the first UE, one or more resources reserved by the UEs in the list, wherein the first subset of resources comprises the one or more resources; and reporting a UE identifier with each of the one or more resources, the UE identifier identifying a UE in the list that reserved the resource.

Aspect 9: The method of any of aspects 1 through 8, further comprising: receiving, from the second protocol stack layer of the first UE, a threshold quantity of UEs; and identifying that at least the threshold quantity of UEs are scheduled to transmit on at least one resource of the first subset of resources, wherein reporting the second subset of resources for the sidelink transmission comprises: reporting the second subset of resources for the sidelink transmission based at least in part on the threshold quantity of UEs being scheduled to transmit in the at least one resource, wherein the at least one resource is excluded from the second subset of resources.

Aspect 10: The method of aspect 9, wherein reporting the second subset of resources for the sidelink transmission comprises: reporting at least a threshold percentage of a set of resources for the sidelink transmission after excluding the at least one resource.

Aspect 11: The method of any of aspects 9 through 10, wherein the sidelink transmission comprises a groupcast or broadcast transmission.

Aspect 12: The method of any of aspects 1 through 11, wherein the set of parameters comprises a threshold percentage of a set of resources to report for the sidelink transmission, a priority of the sidelink transmission, a reference signal received power threshold for selecting resources, or a combination thereof.

Aspect 13: A method for wireless communication at a first UE, comprising: providing, to a first protocol stack layer of the first UE from a second protocol stack layer of the first UE, an indication of a set of parameters; providing, to the first protocol stack layer of the first UE, an indication of a first subset of resources in which the first UE is scheduled to receive, a second UE is scheduled to transmit, or both; receiving, from the first protocol stack layer of the first UE, a second subset of resources for a sidelink transmission based at least in part on sidelink control information, the set of parameters, and the first subset of resources; and providing, to the first protocol stack layer, an indication of a resource for the sidelink transmission in response to receiving the second subset of resources for the sidelink transmission.

Aspect 14: The method of aspect 13, wherein receiving the second subset of resources for the sidelink transmission comprises: receiving at least a threshold percentage of a set of resources, wherein the first subset of resources is excluded from the at least the threshold percentage of the set of resources.

Aspect 15: The method of aspect 14, wherein the threshold percentage is based at least in part on a size of the first subset of resources.

Aspect 16: The method of aspect 15, wherein the threshold percentage is a first threshold percentage that comprises a maximum of two values, the two values comprising: a first value corresponding to a minimum of a second threshold percentage of the set of resources to be reported; and a second value corresponding to the second threshold percentage multiplied by a scaling factor, wherein the scaling factor is based at least in part on the size of the first subset of resources.

Aspect 17: The method of any of aspects 13 through 16, wherein receiving the second subset of resources for the sidelink transmission comprises: receiving at least a threshold percentage of all resources in a set of resources excluding the first subset of resources.

Aspect 18: The method of aspect 17, further comprising: receiving, from the first protocol stack layer, one or more resources in the first subset of resources for the sidelink transmission; and avoiding selecting the resource for the sidelink transmission from the one or more resources in the first subset of resources based at least in part on the first UE being scheduled to receive on the one or more resources, the second UE being scheduled to transmit on the one or more resources, or both.

Aspect 19: The method of any of aspects 13 through 18, wherein providing the indication of the first subset of resources in which the first UE is scheduled to receive, the second UE is scheduled to transmit, or both comprises: providing a list of one or more UEs scheduled to transmit data to or receive data from the first UE, wherein the list of one or more UEs comprises the second UE, and at least one resource of the first subset of resources is reserved by the second UE.

Aspect 20: The method of aspect 19, further comprising: receiving an indication of one or more resources reserved by the UEs in the list, wherein the first subset of resources comprises the one or more resources; and receiving a UE identifier with each of the one or more resources, the UE identifier identifying a UE in the list that reserved the resource.

Aspect 21: The method of any of aspects 13 through 20, further comprising: providing, to the first protocol stack layer of the first UE, a threshold quantity of UEs, wherein receiving the second subset of resources for the sidelink transmission comprises: receiving the second subset of resources for the sidelink transmission based at least in part on providing the threshold quantity of UEs, wherein at least one resource of the first subset of resources is excluded from the second subset of resources based at least in part on the threshold quantity of UEs being scheduled to transmit in the at least one resource.

Aspect 22: The method of aspect 21, wherein receiving the second subset of resources for the sidelink transmission comprises: receiving at least a threshold percentage of a set of resources for the sidelink transmission after the first subset of resources is excluded.

Aspect 23: The method of any of aspects 21 through 22, wherein the sidelink transmission comprises a groupcast or broadcast transmission.

Aspect 24: The method of any of aspects 13 through 23, wherein the set of parameters comprises a threshold percentage of a set of resources to report for the sidelink transmission, a priority of the sidelink transmission, a reference signal received power threshold for selecting resources, or a combination thereof.

Aspect 25: An apparatus for wireless communication at a first UE, comprising a processor and memory coupled to the processor, the processor and memory configured to perform a method of any of aspects 1 through 12.

Aspect 26: An apparatus for wireless communication at a first UE, comprising at least one means for performing a method of any of aspects 1 through 12.

Aspect 27: A non-transitory computer-readable medium storing code for wireless communication at a first UE, the code comprising instructions executable by a processor to perform a method of any of aspects 1 through 12.

Aspect 28: An apparatus for wireless communication at a first UE, comprising a processor and memory coupled to the processor, the processor and memory configured to perform a method of any of aspects 13 through 24.

Aspect 29: An apparatus for wireless communication at a first UE, comprising at least one means for performing a method of any of aspects 13 through 24.

Aspect 30: A non-transitory computer-readable medium storing code for wireless communication at a first UE, the code comprising instructions executable by a processor to perform a method of any of aspects 13 through 24.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a first user equipment (UE), comprising:
   receiving, at a first protocol stack layer of the first UE from a second protocol stack layer of the first UE, an indication of a set of parameters;
   receiving, from the second protocol stack layer of the first UE, an indication of a first subset of resources in which the first UE is scheduled to receive, a second UE is scheduled to transmit, or both;
   reporting, to the second protocol stack layer of the first UE, a second subset of resources for a sidelink transmission based at least in part on sidelink control information, the set of parameters, and the first subset of resources; and
   receiving, from the second protocol stack layer, an indication of a resource for the sidelink transmission in response to reporting the second subset of resources for the sidelink transmission.

2. The method of claim 1, wherein reporting the second subset of resources for the sidelink transmission comprises:
   reporting at least a threshold percentage of a set of resources, wherein the first subset of resources is excluded from the at least the threshold percentage of the set of resources.

3. The method of claim 2, wherein the threshold percentage is based at least in part on a size of the first subset of resources.

4. The method of claim 3, wherein the threshold percentage comprises a first threshold percentage and corresponds to a maximum of two values, the two values comprising:
   a first value corresponding to a minimum of a second threshold percentage of the set of resources to be reported; and
   a second value corresponding to the second threshold percentage multiplied by a scaling factor, wherein the scaling factor is based at least in part on the size of the first subset of resources.

5. The method of claim 1, wherein reporting the second subset of resources for the sidelink transmission comprises:
   reporting at least a threshold percentage of all resources in a set of resources excluding the first subset of resources.

6. The method of claim 5, further comprising:
   reporting, to the second protocol stack layer of the first UE, one or more resources in the first subset of resources for the sidelink transmission.

7. The method of claim 1, wherein receiving the indication of the first subset of resources in which the first UE is scheduled to receive, the second UE is scheduled to transmit, or both comprises:
   receiving a list of one or more UEs scheduled to transmit data to or receive data from the first UE, wherein the list of one or more UEs comprises the second UE;
   identifying that at least one resource of the first subset of resources is reserved by the second UE; and
   determining that the second UE is scheduled to transmit on the at least one resource based at least in part on identifying that the at least one resource is reserved by the second UE.

8. The method of claim 7, further comprising:
   reporting, to the second protocol stack layer of the first UE, one or more resources reserved by the UEs in the list, wherein the first subset of resources comprises the one or more resources; and
   reporting a UE identifier with each of the one or more resources, the UE identifier identifying a UE in the list that reserved the resource.

9. The method of claim 1, further comprising:
   receiving, from the second protocol stack layer of the first UE, a threshold quantity of UEs; and
   identifying that at least the threshold quantity of UEs are scheduled to transmit on at least one resource of the first subset of resources, wherein reporting the second subset of resources for the sidelink transmission comprises:
      reporting the second subset of resources for the sidelink transmission based at least in part on the threshold quantity of UEs being scheduled to transmit in the at least one resource, wherein the at least one resource is excluded from the second subset of resources.

10. The method of claim 9, wherein reporting the second subset of resources for the sidelink transmission comprises:
    reporting at least a threshold percentage of a set of resources for the sidelink transmission after excluding the at least one resource.

11. The method of claim 9, wherein the sidelink transmission comprises a groupcast or broadcast transmission.

12. The method of claim 1, wherein the set of parameters comprises a threshold percentage of a set of resources to report for the sidelink transmission, a priority of the sidelink transmission, a reference signal received power threshold for selecting resources, or a combination thereof.

13. A method for wireless communication at a first user equipment (UE), comprising:
    providing, to a first protocol stack layer of the first UE from a second protocol stack layer of the first UE, an indication of a set of parameters;
    providing, to the first protocol stack layer of the first UE, an indication of a first subset of resources in which the first UE is scheduled to receive, a second UE is scheduled to transmit, or both;
    receiving, from the first protocol stack layer of the first UE, a second subset of resources for a sidelink transmission based at least in part on sidelink control information, the set of parameters, and the first subset of resources; and
    providing, to the first protocol stack layer, an indication of a resource for the sidelink transmission in response to receiving the second subset of resources for the sidelink transmission.

14. The method of claim 13, wherein receiving the second subset of resources for the sidelink transmission comprises:
    receiving at least a threshold percentage of a set of resources, wherein the first subset of resources is excluded from the at least the threshold percentage of the set of resources.

15. The method of claim 14, wherein the threshold percentage is based at least in part on a size of the first subset of resources.

16. The method of claim 15, wherein the threshold percentage is a first threshold percentage that comprises a maximum of two values, the two values comprising:
    a first value corresponding to a minimum of a second threshold percentage of the set of resources to be reported; and
    a second value corresponding to the second threshold percentage multiplied by a scaling factor, wherein the scaling factor is based at least in part on the size of the first subset of resources.

17. The method of claim 13, wherein receiving the second subset of resources for the sidelink transmission comprises:
receiving at least a threshold percentage of all resources in a set of resources excluding the first subset of resources.

18. The method of claim 17, further comprising:
receiving, from the first protocol stack layer, one or more resources in the first subset of resources for the sidelink transmission; and
avoiding selecting the resource for the sidelink transmission from the one or more resources in the first subset of resources based at least in part on the first UE being scheduled to receive on the one or more resources, the second UE being scheduled to transmit on the one or more resources, or both.

19. The method of claim 13, wherein providing the indication of the first subset of resources in which the first UE is scheduled to receive, the second UE is scheduled to transmit, or both comprises:
providing a list of one or more UEs scheduled to transmit data to or receive data from the first UE, wherein the list of one or more UEs comprises the second UE, and at least one resource of the first subset of resources is reserved by the second UE.

20. The method of claim 19, further comprising:
receiving an indication of one or more resources reserved by the UEs in the list of one or more UEs, wherein the first subset of resources comprises the one or more resources; and
receiving a UE identifier with each of the one or more resources, the UE identifier identifying a UE in the list of one or more UEs that reserved the resource.

21. The method of claim 13, further comprising:
providing, to the first protocol stack layer of the first UE, a threshold quantity of UEs, wherein receiving the second subset of resources for the sidelink transmission comprises:
receiving the second subset of resources for the sidelink transmission based at least in part on providing the threshold quantity of UEs, wherein at least one resource of the first subset of resources is excluded from the second subset of resources based at least in part on the threshold quantity of UEs being scheduled to transmit in the at least one resource.

22. The method of claim 21, wherein receiving the second subset of resources for the sidelink transmission comprises:
receiving at least a threshold percentage of a set of resources for the sidelink transmission after the first subset of resources is excluded.

23. The method of claim 21, wherein the sidelink transmission comprises a groupcast or broadcast transmission.

24. The method of claim 13, wherein the set of parameters comprises a threshold percentage of a set of resources to report for the sidelink transmission, a priority of the sidelink transmission, a reference signal received power threshold for selecting resources, or a combination thereof.

25. An apparatus for wireless communication at a first user equipment (UE), comprising:
at least one processor; and
at least one memory coupled to the at least one processor, the at least one processor configured to:
receive, at a first protocol stack layer of the first UE from a second protocol stack layer of the first UE, an indication of a set of parameters;
receive, from the second protocol stack layer of the first UE, an indication of a first subset of resources in which the first UE is scheduled to receive, a second UE is scheduled to transmit, or both;
report, to the second protocol stack layer of the first UE, a second subset of resources for a sidelink transmission based at least in part on sidelink control information, the set of parameters, and the first subset of resources; and
receive, from the second protocol stack layer, an indication of a resource for the sidelink transmission in response to reporting the second subset of resources for the sidelink transmission.

26. The apparatus of claim 25, wherein, to report the second subset of resources for the sidelink transmission, the at least one processor is configured to:
report at least a threshold percentage of a set of resources, wherein the first subset of resources is excluded from the at least the threshold percentage of the set of resources.

27. The apparatus of claim 26, wherein the threshold percentage is based at least in part on a size of the first subset of resources.

28. The apparatus of claim 25, wherein, to report the second subset of resources for the sidelink transmission, the at least one processor is configured to:
report at least a threshold percentage of all resources in a set of resources excluding the first subset of resources.

29. The apparatus of claim 28, wherein the at least one processor is configured to:
report, to the second protocol stack layer of the first UE, one or more resources in the first subset of resources for the sidelink transmission.

30. The apparatus of claim 25, wherein, to receive the indication of the first subset of resources in which the first UE is scheduled to receive, the second UE is scheduled to transmit, or both, the at least one processor is configured to:
receive a list of one or more UEs scheduled to transmit data to or receive data from the first UE, wherein the list of one or more UEs comprises the second UE;
identify that at least one resource of the first subset of resources is reserved by the second UE; and
determine that the second UE is scheduled to transmit on the at least one resource based at least in part on identifying that the at least one resource is reserved by the second UE.

31. The apparatus of claim 30, wherein the at least one processor is configured to:
report, to the second protocol stack layer of the first UE, one or more resources reserved by the UEs in the list of one or more UEs, wherein the first subset of resources comprises the one or more resources; and
report a UE identifier with each of the one or more resources, the UE identifier identifying a UE in the list of one or more UEs that reserved the resource.

32. The apparatus of claim 25, the at least one processor is configured to:
receive, from the second protocol stack layer of the first UE, a threshold quantity of UEs; and
identify that at least the threshold quantity of UEs are scheduled to transmit on at least one resource of the first subset of resources, wherein reporting the second subset of resources for the sidelink transmission comprises:
report the second subset of resources for the sidelink transmission based at least in part on the threshold quantity of UEs being scheduled to transmit in the at least one resource, wherein the at least one resource is excluded from the second subset of resources.

33. The apparatus of claim 32, wherein, to report the second subset of resources for the sidelink transmission, the at least one processor is configured to:
report at least a threshold percentage of a set of resources for the sidelink transmission after excluding the at least one resource.

34. The apparatus of claim 25, wherein the set of parameters comprises a threshold percentage of a set of resources to report for the sidelink transmission, a priority of the sidelink transmission, a reference signal received power threshold for selecting resources, or a combination thereof.

35. An apparatus for wireless communication at a first user equipment (UE), comprising:
at least one processor; and
at least one memory coupled to the at least one processor, the at least one processor configured to:
provide, to a first protocol stack layer of the first UE from a second protocol stack layer of the first UE, an indication of a set of parameters;
provide, to the first protocol stack layer of the first UE, an indication of a first subset of resources in which the first UE is scheduled to receive, a second UE is scheduled to transmit, or both;
receive, from the first protocol stack layer of the first UE, a second subset of resources for a sidelink transmission based at least in part on sidelink control information, the set of parameters, and the first subset of resources; and
provide, to the first protocol stack layer, an indication of a resource for the sidelink transmission in response to receiving the second subset of resources for the sidelink transmission.

36. The apparatus of claim 35, wherein, to receive the second subset of resources for the sidelink transmission, the at least one processor is configured to:
receive at least a threshold percentage of a set of resources, wherein the first subset of resources is excluded from the at least the threshold percentage of the set of resources.

37. The apparatus of claim 36, wherein the threshold percentage is based at least in part on a size of the first subset of resources.

38. The apparatus of claim 35, wherein, to receive the second subset of resources for the sidelink transmission, the at least one processor is configured to:
receive at least a threshold percentage of all resources in a set of resources excluding the first subset of resources.

39. The apparatus of claim 38, wherein the at least one processor is configured to:
receive, from the first protocol stack layer, one or more resources in the first subset of resources for the sidelink transmission; and
avoid selecting the resource for the sidelink transmission from the one or more resources in the first subset of resources based at least in part on the first UE being scheduled to receive on the one or more resources, the second UE being scheduled to transmit on the one or more resources, or both.

40. The apparatus of claim 35, wherein, to provide the indication of the first subset of resources in which the first UE is scheduled to receive, the second UE is scheduled to transmit, the at least one processor is configured to:
provide a list of one or more UEs scheduled to transmit data to or receive data from the first UE, wherein the list of one or more UEs comprises the second UE, and at least one resource of the first subset of resources is reserved by the second UE.

41. The apparatus of claim 40, the at least one processor is configured to:
receive an indication of one or more resources reserved by the UEs in the list of one or more UEs, wherein the first subset of resources comprises the one or more resources; and
receive a UE identifier with each of the one or more resources, the UE identifier identifying a UE in the list of one or more UEs that reserved the resource.

42. The apparatus of claim 35, the at least one processor is configured to:
provide, to the first protocol stack layer of the first UE, a threshold quantity of UEs, wherein receiving the second subset of resources for the sidelink transmission comprises:
receive the second subset of resources for the sidelink transmission based at least in part on providing the threshold quantity of UEs, wherein at least one resource of the first subset of resources is excluded from the second subset of resources based at least in part on the threshold quantity of UEs being scheduled to transmit in the at least one resource.

43. The apparatus of claim 42, wherein, to receive the second subset of resources for the sidelink transmission, the at least one processor is configured to:
receive at least a threshold percentage of a set of resources for the sidelink transmission after the first subset of resources is excluded.

44. The apparatus of claim 35, wherein the set of parameters comprises a threshold percentage of a set of resources to report for the sidelink transmission, a priority of the sidelink transmission, a reference signal received power threshold for selecting resources, or a combination thereof.

45. A non-transitory computer-readable medium storing code for wireless communications by a first user equipment (UE), the code comprising instructions executable by at least one processor to:
receive, at a first protocol stack layer of the first UE from a second protocol stack layer of the first UE, an indication of a set of parameters;
receive, from the second protocol stack layer of the first UE, an indication of a first subset of resources in which the first UE is scheduled to receive, a second UE is scheduled to transmit, or both;
report, to the second protocol stack layer of the first UE, a second subset of resources for a sidelink transmission based at least in part on sidelink control information, the set of parameters, and the first subset of resources; and
receive, from the second protocol stack layer, an indication of a resource for the sidelink transmission in response to reporting the second subset of resources for the sidelink transmission.

46. The non-transitory computer-readable medium of claim 45, wherein the code comprising instructions executable by the at least one processor to report the second subset of resources for the sidelink transmission further comprises instructions executable by the at least one processor to:
report at least a threshold percentage of a set of resources, wherein the first subset of resources is excluded from the at least the threshold percentage of the set of resources.

47. The non-transitory computer-readable medium of claim 46, wherein the threshold percentage is based at least in part on a size of the first subset of resources.

48. The non-transitory computer-readable medium of claim 47, wherein the threshold percentage comprises a first threshold percentage and corresponds to a maximum of two values, the two values comprising:
 a first value corresponding to a minimum of a second threshold percentage of the set of resources to be reported; and
 a second value corresponding to the second threshold percentage multiplied by a scaling factor, wherein the scaling factor is based at least in part on the size of the first subset of resources.

49. The non-transitory computer-readable medium of claim 45, wherein the code comprising instructions executable by the at least one processor to report the second subset of resources for the sidelink transmission further comprises instructions executable by the at least one processor to:
 report at least a threshold percentage of all resources in a set of resources excluding the first subset of resources.

50. The non-transitory computer-readable medium of claim 45, wherein the code comprising instructions executable by the at least one processor to receive the indication of the first subset of resources in which the first UE is scheduled to receive, the second UE is scheduled to transmit, or both further comprises instructions executable by the at least one processor to:
 receive a list of one or more UEs scheduled to transmit data to or receive data from the first UE, wherein the list of one or more UEs comprises the second UE;
 identify that at least one resource of the first subset of resources is reserved by the second UE; and
 determine that the second UE is scheduled to transmit on the at least one resource based at least in part on identifying that the at least one resource is reserved by the second UE.

51. The non-transitory computer-readable medium of claim 45, the code further comprising instructions executable by the at least one processor to:
 receive, from the second protocol stack layer of the first UE, a threshold quantity of UEs; and
 identify that at least the threshold quantity of UEs are scheduled to transmit on at least one resource of the first subset of resources, wherein reporting the second subset of resources for the sidelink transmission comprises:
 report the second subset of resources for the sidelink transmission based at least in part on the threshold quantity of UEs being scheduled to transmit in the at least one resource, wherein the at least one resource is excluded from the second subset of resources.

52. A non-transitory computer-readable medium storing code for wireless communications by a first user equipment (UE), the code comprising instructions executable by at least one processor to:
 provide, to a first protocol stack layer of the first UE from a second protocol stack layer of the first UE, an indication of a set of parameters;
 provide, to the first protocol stack layer of the first UE, an indication of a first subset of resources in which the first UE is scheduled to receive, a second UE is scheduled to transmit, or both;
 receive, from the first protocol stack layer of the first UE, a second subset of resources for a sidelink transmission based at least in part on sidelink control information, the set of parameters, and the first subset of resources; and
 provide, to the first protocol stack layer, an indication of a resource for the sidelink transmission in response to receiving the second subset of resources for the sidelink transmission.

53. The non-transitory computer-readable medium of claim 52, wherein the code comprising instructions executable by the at least one processor to receiv3 the second subset of resources for the sidelink transmission further comprises instructions executable by the at least one processor to:
 receiving at least a threshold percentage of a set of resources, wherein the first subset of resources is excluded from the at least the threshold percentage of the set of resources.

54. The non-transitory computer-readable medium of claim 53, wherein the threshold percentage is based at least in part on a size of the first subset of resources.

55. The non-transitory computer-readable medium of claim 54, wherein the threshold percentage is a first threshold percentage that comprises a maximum of two values, the two values comprising:
 a first value corresponding to a minimum of a second threshold percentage of the set of resources to be reported; and
 a second value corresponding to the second threshold percentage multiplied by a scaling factor, wherein the scaling factor is based at least in part on the size of the first subset of resources.

56. The non-transitory computer-readable medium of claim 52, wherein the code comprising instructions executable by the at least one processor to receive the second subset of resources for the sidelink transmission further comprises instructions executable by the at least one processor to:
 receive at least a threshold percentage of all resources in a set of resources excluding the first subset of resources.

57. The non-transitory computer-readable medium of claim 52, wherein the code comprising instructions executable by the at least one processor to provide the indication of the first subset of resources in which the first UE is scheduled to receive, the second UE is scheduled to transmit, or both further comprises instructions executable by the at least one processor to:
 provide a list of one or more UEs scheduled to transmit data to or receive data from the first UE, wherein the list of one or more UEs comprises the second UE, and at least one resource of the first subset of resources is reserved by the second UE.

58. The non-transitory computer-readable medium of claim 52, the code further comprising instructions executable by the at least one processor to:
 provide, to the first protocol stack layer of the first UE, a threshold quantity of UEs, wherein receiving the second subset of resources for the sidelink transmission comprises:
 receive the second subset of resources for the sidelink transmission based at least in part on providing the threshold quantity of UEs, wherein at least one resource of the first subset of resources is excluded from the second subset of resources based at least in part on the threshold quantity of UEs being scheduled to transmit in the at least one resource.

* * * * *